US010084728B2

(12) United States Patent
McCann et al.

(10) Patent No.: US 10,084,728 B2
(45) Date of Patent: Sep. 25, 2018

(54) LOCALIZED TRAFFIC FLOW MANAGEMENT IN A WIRELESS NETWORK

(71) Applicant: Futurewei Technologies, Inc., Plano, TX (US)

(72) Inventors: Peter McCann, Bridgewater, NJ (US); Jiangnan Jason Chen, Hawthorn Woods, IL (US)

(73) Assignee: Futurewei Technologies, Inc., Plano, TX (US)

( * ) Notice: Subject to any disclaimer, the term of this patent is extended or adjusted under 35 U.S.C. 154(b) by 124 days.

(21) Appl. No.: 15/130,046

(22) Filed: Apr. 15, 2016

(65) Prior Publication Data

US 2016/0337271 A1 Nov. 17, 2016

Related U.S. Application Data

(60) Provisional application No. 62/159,751, filed on May 11, 2015.

(51) Int. Cl.
*H04L 12/931* (2013.01)
*H04W 40/20* (2009.01)
*H04W 40/02* (2009.01)
*H04L 12/721* (2013.01)

(52) U.S. Cl.
CPC .......... *H04L 49/70* (2013.01); *H04W 40/20* (2013.01); *H04L 45/124* (2013.01); *H04W 40/02* (2013.01)

(58) Field of Classification Search
CPC ..... H04L 12/761; H04L 49/70; H04L 45/124; H04W 28/02; H04W 40/20; H04W 40/02
See application file for complete search history.

(56) References Cited

U.S. PATENT DOCUMENTS

| 8,654,709 | B2 | 2/2014 | Centonza et al. |
| 2003/0067874 | A1 | 4/2003 | See et al. |
| 2009/0303881 | A1 | 12/2009 | Tsirtsis et al. |

(Continued)

FOREIGN PATENT DOCUMENTS

| CN | 102057733 A | 5/2011 |
| CN | 103036750 A | 4/2013 |

OTHER PUBLICATIONS

International Search Report and Written Opinion dated Jul. 26, 2016 in International Patent Application No. PCT/CN2016/079739, 12 pages.

(Continued)

*Primary Examiner* — Charles C Jiang
*Assistant Examiner* — Kyaw Z Soe
(74) *Attorney, Agent, or Firm* — Vierra Magen Marcus LLP

(57) ABSTRACT

The disclosure relates to technology for a local control point in a communication system. The local control point may be an enterprise gateway configured as a gateway between radio access nodes and a core network that provides wireless communication for wireless devices that connect to the radio access nodes. The enterprise gateway may be connected to radio access nodes in a venue such as a retail shopping center, workplace, sports arena, public street, etc. The enterprise gateway may perform traffic flow management with respect to the local traffic in the venue. The enterprise gateway can make better decisions for traffic flow at the venue than a centralized point, such as a core network.

20 Claims, 23 Drawing Sheets

(56) References Cited

U.S. PATENT DOCUMENTS

| | | | | |
|---|---|---|---|---|
| 2010/0188975 A1* | 7/2010 | Raleigh | ............ | G06Q 10/06375 370/230.1 |
| 2013/0083724 A1 | 4/2013 | Sindhu et al. | | |
| 2013/0203435 A1* | 8/2013 | Smith | ................... | H04W 16/14 455/454 |
| 2014/0355570 A1* | 12/2014 | Smith | ............... | H04W 36/0072 370/332 |
| 2014/0362807 A1* | 12/2014 | Bhatnagar | ............... | H04W 4/00 370/329 |
| 2015/0009875 A1 | 1/2015 | Khoryaev et al. | | |
| 2015/0100990 A1* | 4/2015 | Walker | ................... | H04L 12/18 725/74 |

OTHER PUBLICATIONS

Banerjee, Arijit, et al., "MOCA: A Lightweight Mobile Cloud Offloading Architecture," Proceedings of the 8th ACM International Workshop on Mobility in the evolving internet architecture, May 2013, 6 pages.

Cho, Junguk, et al., "SMORE: Software-Defined Networking Mobile Offloading Architecture," Proceedings of the 4th Workshop on All Things Cellular: Operations, Applications and Challenges, Jul. 2014, 6 pages.

Said, Siwar Ben Hadj, et al., "New Control Plane in 3GPP LTE/EPC Architecture for On-Demand Connectivity Service," IEEE 2nd International Conference on Cloud Networking (CloudNet), Nov. 2013, 5 pages.

\* cited by examiner

| Field | Value | Ref |
|---|---|---|
| Group Name | Accounting Dept | 922 |
| Members | IMSI/450062014020507, NAI/user@example.com | 924 |
| Valid Locations | eNB-3F1, eNB-3F2 | 926 |
| Allowed LBO | IP/10.1.1.0/8 | 928 |
| Allowed Home Routed | IP/0.0.0.0/0 | 930 |
| Blocked | IP/172.16.0.0/16 | 932 |

LOCALIZED TRAFFIC FLOW MANAGEMENT IN A WIRELESS NETWORK

CLAIM FOR PRIORITY

This application claims the benefit of priority to U.S. Provisional Application Ser. No. 62/159,751, filed May 11, 2015, the contents of which are hereby incorporated by reference.

BACKGROUND

A telecommunication network may include a core network, which is typically a central point that provides many essential functions. For example, the core network may authenticate users of wireless devices attempting to gain access to the telecommunication network. The core network may have gateways to provide access to the core network, as well as to other networks such as the Internet or the public switched telephone network (PSTN). The core network typically performs some routing and switching functions.

For efficiency, the core network may be centralized and large scale. However, the core network might not work well with requirements of a local domain that provides wireless communication (e.g., sports stadium, retail stores, airport, offices, etc.).

BRIEF SUMMARY

One embodiment is a device comprises a non-transitory memory storage comprising instructions, and one or more processors in communication with the non-transitory memory storage. The one or more processors execute the instructions to provide a control point that controls traffic between radio access nodes and a core network that provides wireless communication for wireless devices that connect to the radio access nodes. The radio access nodes serve a local venue. The processors also execute instructions to perform traffic flow management at the control point for traffic associated with the radio access nodes based on policies adapted to the local venue.

One embodiment is a method for providing localized control in a wireless network. The method comprises providing an enterprise gateway configured to control traffic between radio access nodes and a core network that provides wireless communication for wireless devices that connect to the radio access nodes. The method also comprises performing traffic flow management at the enterprise gateway for traffic associated with the radio access nodes based on policies from a local venue that is served by the radio access nodes.

One embodiment, is an apparatus, comprising a gateway control element, a control logic element, a switch element, and a service computation element. The gateway control element is configured to communicate with a core network using a control plane interface compliant with a wireless communication protocol used by the core network to provide wireless communication to wireless devices that connect to radio access nodes. The radio access nodes are small cells that serve a local enterprise. The control logic element is configured to communicate with a management entity in the core network. The switch element is configured to route traffic to perform traffic flow management between the radio access nodes and the apparatus. The traffic flow management is based on policies from the local enterprise. The switch element is configured to implement a user plane of a wireless communication protocol of the wireless communication provided by the core network. The service computation element is configured to instruct the switch element with respect to performing the traffic flow management based on the policies from the local enterprise and information received from the gateway control element regarding wireless devices connected to the radio access nodes.

One embodiment is a non-transitory computer-readable medium storing computer instructions that, when executed by one or more processors: provide an enterprise gateway between radio access nodes and a core network that provides wireless communication for wireless devices that connect to the radio access nodes. The radio access nodes are small cells that serve a local enterprise. The instructions that, when executed by one or more processors, also perform traffic flow management at the enterprise gateway for traffic between the radio access nodes and the enterprise gateway. The traffic flow management is based on policies from the local enterprise.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

FIG. 9B shows one example of local policy.

DETAILED DESCRIPTION

The disclosure relates to technology for a local control point in a communication system. In one embodiment, the local control point is an enterprise gateway configured to control traffic between radio access nodes and a core network that provides wireless communication for wireless devices that connect to the radio access nodes. The core network could be compliant with an evolved packet core (EPC). For efficiency, the core network may be centralized and large scale. However, the core network might not work well with requirements of a local venue (e.g., sports stadium, retail stores, airport, and offices) that is served by the radio access nodes. The core network typically performs some routing and switching functions. However, performing routing and switching functions in a centralized location does not meet the needs of traffic of the local venue. For example, some local hospital traffic (e.g., patient records) may need to stay local, whereas other hospital traffic can be routed back to operator's core network (in different city, for example). It can be difficult for the core network to properly route the local traffic.

Embodiments disclosed herein include a local control point in a communication system. In one embodiment, local control point is an enterprise gateway configured as a gateway between radio access nodes and a core network that provides wireless communication for wireless devices that connect to the radio access nodes. The enterprise gateway may be connected to radio access nodes in a venue such as a retail shopping center, workplace, sports arena, public street, etc. The enterprise gateway may perform traffic flow management with respect to the local traffic in the venue. The enterprise gateway can make better decisions than a centralized point, such as a core network.

Figure 1:
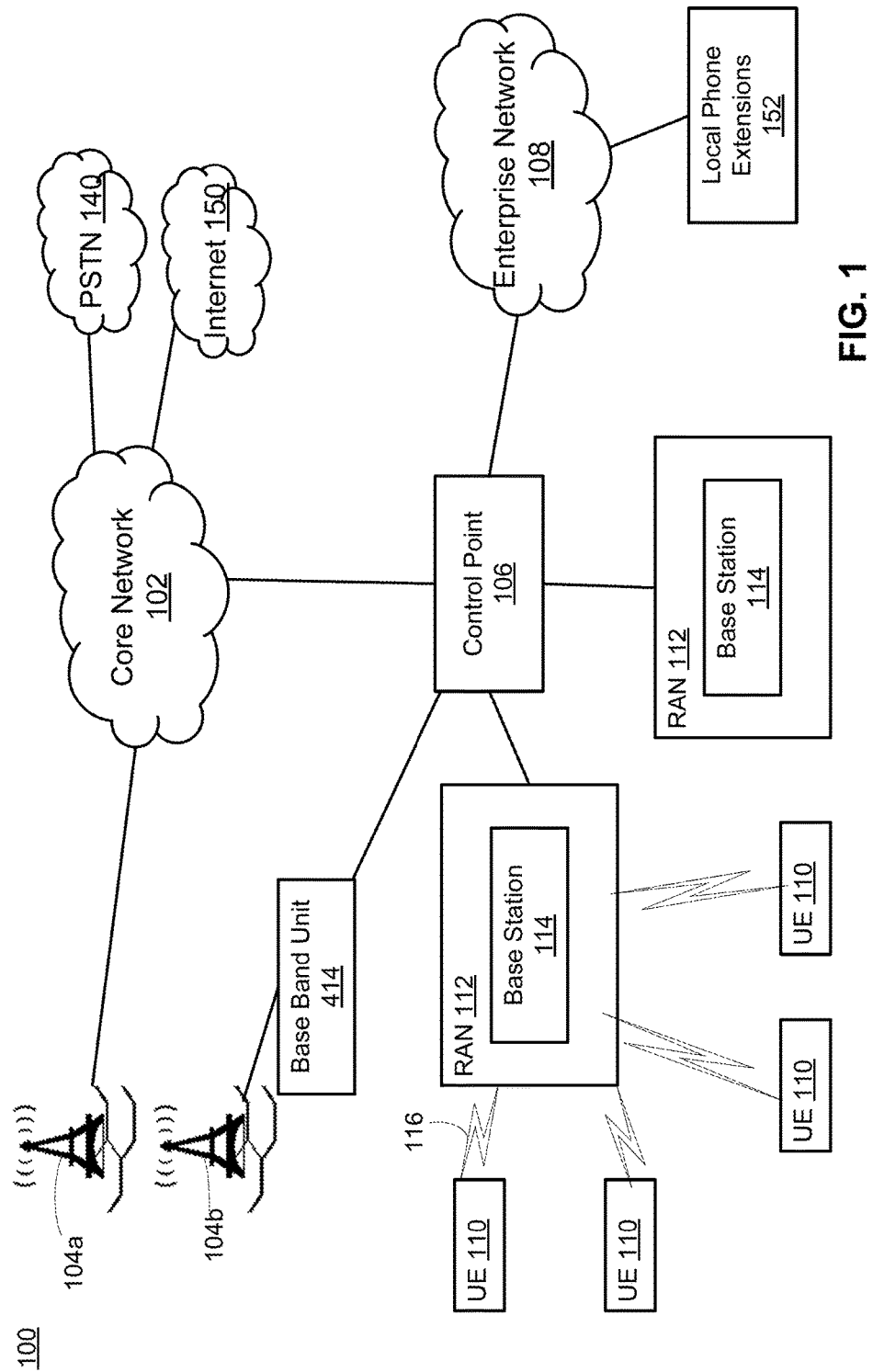
FIG. 1 illustrates an example communication system in which embodiments of a control point may be practiced.

FIG. 1 illustrates an example communication system 100 in which embodiments of a control point 106 may be practiced. As illustrated, the communication system 100 includes, but is not limited to, core network 102, control point 106, radio access networks (RAN) 112, base stations 114, user equipment (UE) 110, enterprise network 108, macro cells 104*a*, 104*b*, public switched telephone network (PSTN) 140, and the Internet 150. Note that macro cell 104*a* is connected to core network 102, but macro cell 104*b* is connected directly to control point 106.

In one embodiment, enterprise network 108, control point 106, and RAN 112 serve some local venue (e.g., local enterprise) such as, but not limited to, retail shopping center, workplace, airport, or sports arena. The control point 106 may provide traffic flow management for the local venue (or local enterprise).

Enterprise network 108 may provide services (e.g., local VLAN, enterprise applications, cloud services, etc.) for a local venue such as, but not limited to, retail shopping center, workplace, or sports arena. Those services could include, but are not limited to, access to locally hosted applications, access to locally stored data, access to the Internet, etc. For example, a workplace might provide access to a productivity software application to its workers; a shopping mall might provide an advertisement, product information or coupons to shoppers based on their location in the shopping mall; a sports arena might provide statistics about players to fans in attendance; an airport could provide flight information to passengers, etc. Enterprise network 108 could be implemented by one or more computing systems having one or more processors and computer-readable non-transitory media. For example, enterprise network 108 could be implemented using physical servers, a data center, databases, etc.

The control point 106 is configured to provide traffic flow management for traffic involving RANs 112, in one embodiment. In one embodiment, control point 106 routes traffic between base stations 114 and the enterprise network 108. Thus, some of the traffic may pass between UE 110 and the enterprise network 108 without going through core network 102. The control point 106 may manage traffic flow based on policies provided by enterprise network 108 and/or core network 102. The control point 106 may be more effective at local traffic management than is possible by the core network 102. In one embodiment, control point 106 is implemented as part of an enterprise gateway. The enterprise gateway serves as a gateway for all traffic between the core network 102 and the RANs 112, in one embodiment. The enterprise gateway may be located physically close to the RANs 112. For example, enterprise gateway could be located in or near office building, shopping mall, sports arena, airport, etc. An enterprise gateway may move some of the traditional core network functionality closer to the RAN 112. In one embodiment, the control point 106 has a Network Function Virtualization (NFV) architecture.

In one embodiment, the local control point 106 routes phone calls made by or received by UEs 110. These phone calls could involve PSTN 140 and/or local phone extensions 152. The calls involving the UEs 110 could include mobile to landline (e.g., UE 110 to PSTN 140, mobile to mobile (e.g., UE 110 to UE 110), and mobile to office (e.g., UE 110 to local phone extension 152). In one embodiment, SIP (Session Initiated Protocol) trunking is used. In one embodiment, the local control point 106 has an IP PBX to assist in routing the phone calls involving UEs 110. The UEs 110 may have an IP PBX client application installed thereon.

In general, the communication system 100 enables multiple wireless users to transmit and receive data and other content. The communication system may implement one or more channel access methods, such as code division multiple access (CDMA), time division multiple access (TDMA), frequency division multiple access (FDMA), orthogonal FDMA (OFDMA), or single-carrier FDMA (SC-FDMA).

The control point 106 is configured to provide traffic flow management for macro cell 104*b*, in one embodiment. Macro cell 104*b* has a base band unit (BBU) 414 in this example. The BBU traffic may be routed to the control point 106. Note that there could be many more such macro cells 104*b*. Multiple BBUs 414 could be aggregated together. In one embodiment, both user and control plane traffic from macro cell 104*b* is routed through control point 106. Control point 106 may route that traffic to core network 102, to enterprise network 108, or to one of the RANs 112.

The core network 102 may include the hardware and software that provides a wireless network. The core network 102 may provide wireless communication to UEs 110 in accordance with a wireless communication protocol. The core network 102 can include a collection of gateways through which wireless traffic passes. The core network 102 may be compliant with an evolved packet core (EPC). However, the core network 102 is not required to be EPC compliant. In one embodiment, the core network 102 includes a Serving Gateway (Serving GW), a Packet Data Network Gateway (PDN GW), a Mobility Management Entity (MME) and a Home Subscriber Server (HSS). However, it is not required to include these elements in the core network 102.

The UEs 110 may be configured to operate and/or communicate in the communication system 100. For example, the UEs 100 may be configured to transmit and/or receive wireless signals or wired signals. Each UE 110 represents any suitable end user device and may include such devices (or may be referred to) as a user equipment/device (UE), wireless device, wireless transmit/receive unit (WTRU), mobile station, fixed or mobile subscriber unit, pager, cellular telephone, personal digital assistant (PDA), smartphone, laptop, computer, touchpad, wireless sensor, or consumer electronics device.

The RANs 112 may provide wireless service for a venue or enterprise including, but not limited to, an office building, shopping mall, sports venue, or airport. The RANs 112 here include base stations 114. Each base station 114 is configured to wirelessly interface with one or more of the UEs 110 to enable access to the core network 102, the PSTN 140, the Internet 150, and/or the enterprise network 108. Each base station 114 may include one or more radio access nodes. For example, the base stations 114 may include one or more of several well-known devices, such as a base transceiver station (BTS), a Node-B (NodeB), an evolved NodeB (eNodeB), a Home NodeB, a Home eNodeB, a site controller, an access point (AP), or a wireless router, or a server, router, switch, or other processing entity with a wired or wireless network.

In the embodiment shown in FIG. 1, the base station 114 forms part of the RAN 112, which may include other base stations, elements, and/or devices. Each base station 114 operates to transmit and/or receive wireless signals within a particular geographic region or area, sometimes referred to as a "cell." In some embodiments, multiple-input multiple-output (MIMO) technology may be employed having multiple transceivers for each cell.

The base stations 114 communicate with one or more of the UEs 110 over one or more air interfaces 116 using wireless communication links. The air interfaces 116 may utilize any suitable radio access technology.

It is contemplated that the system 100 may use multiple channel access functionality, including such schemes as described above. In particular embodiments, the base stations and UEs are configured to implement the Long Term Evolution wireless communication standard (LTE), LTE Advanced (LTE-A), and/or LTE Broadcast (LTE-B). The base stations and UEs may be configured to implement unlicensed LTE (or U-LTE). The base stations and UEs may be configured to implement Wi-Fi. In other embodiments, the base stations and UEs are configured to implement UMTS, HSPA, or HSPA+ standards and protocols. Note that a mix of any of these schemes and wireless protocols may be used. Of course, other multiple access schemes and wireless protocols may be utilized.

In one embodiment, the RANs 112 are low-powered radio access nodes, which may be referred to as small cells. Small cells include, but are not limited to, pico cells, femto cells, and micro cells. The base stations 114 might have a range of a few meters up to a few kilometers, in one embodiment. The RANs 112 may be referred to as pico cells, in one embodiment. The RANs 112 may be referred to as femto cells, in one embodiment. The RANs 112 may be referred to as micro cells, in one embodiment. However, the RANs 112 are not limited to being small cells. In one embodiment, the RANs are macro cells. The RANs 112 may be a mix of the foregoing types of cells. Therefore, the RANs 112 are not limited to being low-powered radio access nodes. For example, the RANs 112 could be high power cell towers.

The RANs 112 are in communication with the core network 102 to provide the UEs 110 with voice, data, application, Voice over Internet Protocol (VoIP), or other services. Understandably, the RANs 112 and/or the core network 102 may be in direct or indirect communication with one or more other RANs (such a macro cells 104). The core network 102 may also serve as a gateway access for other networks (such as PSTN 140, Internet 150, and other networks (not shown).

Although FIG. 1 illustrates one example of a communication system, various changes may be made to FIG. 1. For example, the communication system 100 could include any number of UEs 110, RANs 112, base stations 114, enterprise networks 108, control points 106, or other components in any suitable configuration.

Figure 2A:
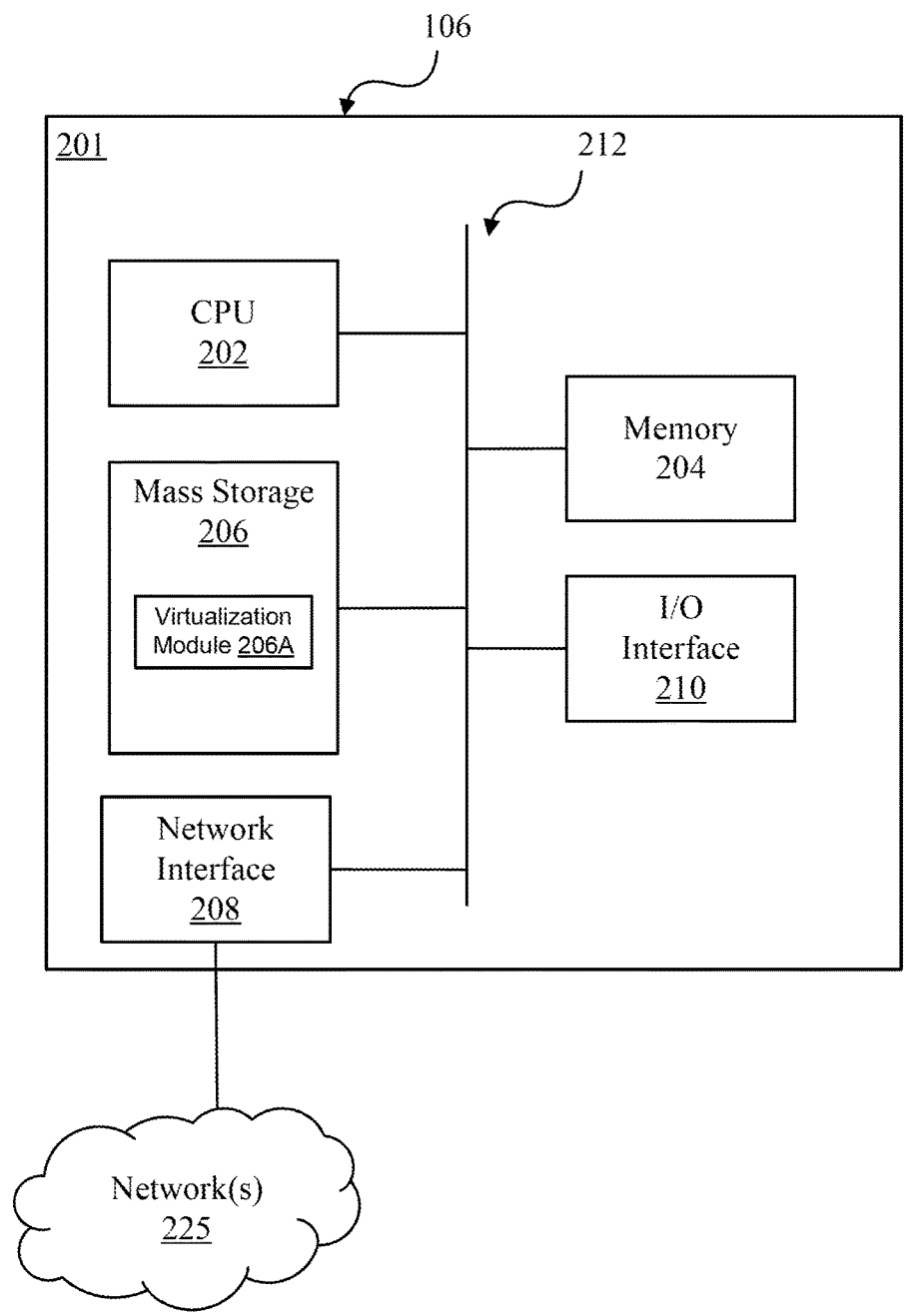
FIGS. 2A-2C illustrate example devices that may implement the methods and teachings according to this disclosure.
Figure 2B:
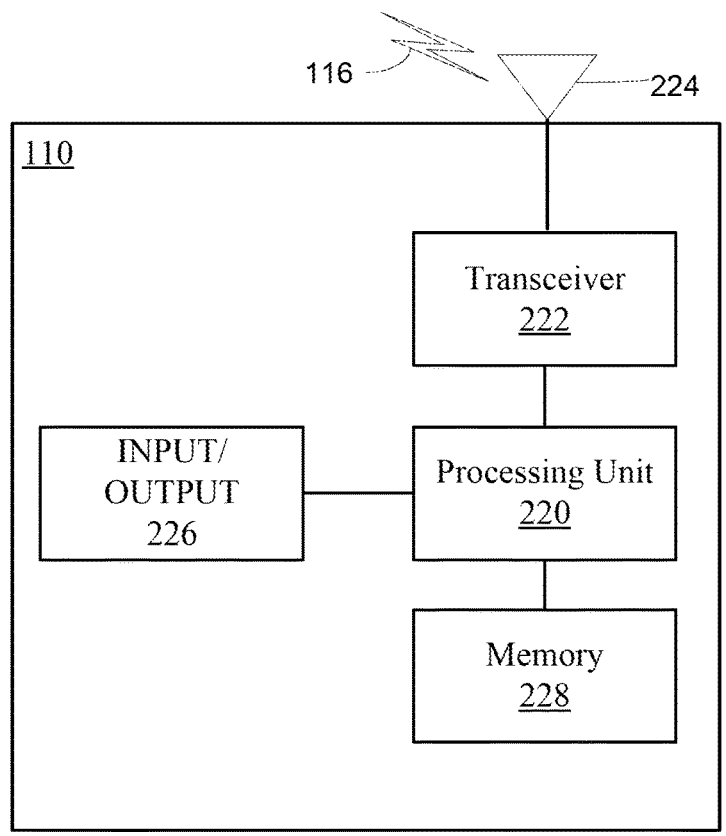
Figure 2C:
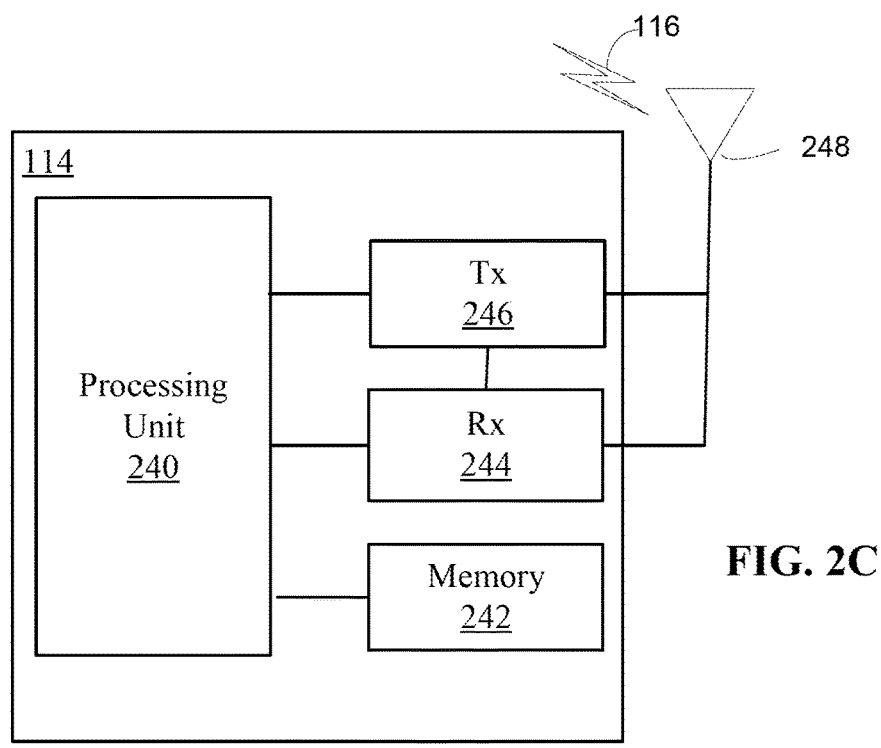

FIGS. 2A-2C illustrate example devices that may implement the methods and teachings according to this disclosure. FIG. 2A is a block diagram of a system that can be used to implement the control point 106. Some control points may utilize all of the components shown, or only a subset of the components, and levels of integration may vary. Furthermore, a control point may contain multiple instances of a component, such as multiple processing units, processors, memories, transmitters, receivers, etc. The control point may comprise a processing unit equipped with one or more input/output devices, such as network interfaces, storage interfaces, and the like. The processing unit 201 may include a central processing unit (CPU) 202, a memory 204, a mass storage device 206, and an I/O interface 210 connected to a bus 212. The bus 212 may be one or more of any type of several bus architectures including a memory bus or memory controller, a peripheral bus or the like.

The CPU 202 may comprise any type of electronic data processor, which may be configured to read and process instructions stored in the memory 204. The memory 204 may comprise any type of system memory such as static random access memory (SRAM), dynamic random access memory (DRAM), synchronous DRAM (SDRAM), read-only memory (ROM), a combination thereof, or the like. In an embodiment, the memory 204 may include ROM for use at boot-up, and DRAM for program and data storage for use while executing programs. In embodiments, the memory 204 is non-transitory. The mass storage device 206 may comprise any type of storage device configured to store data, programs, and other information and to make the data, programs, and other information accessible via the bus. The mass storage device 206 may comprise, for example, one or more of a solid state drive, hard disk drive, a magnetic disk drive, an optical disk drive, or the like.

The mass storage device 206 is computer-readable non-transitory media, in one embodiment. The mass storage device 206 may include instructions that cause CPU 202 to perform one or more of the operations and actions described in the present disclosure. The mass storage device 206 may also include a virtualization module 206A. Virtualization module 206A may implement various virtual machines (when executed by underlying hardware). Virtualization module 206A may implement a virtual switch (not shown) to switch packets on one or more networks and be operable to determine physical network paths.

The computer-readable non-transitory media includes all types of computer readable media, including magnetic storage media, optical storage media, and solid state storage media and specifically excludes signals. It should be understood that the software can be installed in and sold with the control point 106. Alternatively the software can be obtained and loaded into the control point 106, including obtaining the software via a disc medium or from any manner of network or distribution system, including, for example, from a server owned by the software creator or from a server not owned but used by the software creator. The software can be stored on a server for distribution over the Internet, for example.

The processing unit 201 also includes one or more network interfaces 208, which may comprise wired links, such as an Ethernet cable or the like, and/or wireless links to access nodes or one or more networks 880. The network interface 208 allows the processing unit 201 to communicate with remote units via the network(s) 225. For example, the network interface 208 may allow connection to base stations 114, devices in the core network, and devices in the enterprise network 108. Network interface 208 may provide wireline or wireless communication. Network interface 208 may provide wireless communication via one or more transmitters/transmit antennas and one or more receivers/receive antennas. In an embodiment, the processing unit 201 is coupled to a local-area network or a wide-area network for data processing and communications with remote devices, such as other processing units, the Internet, remote storage facilities, or the like.

FIG. 2B depicts an example UE 110. As shown in FIG. 2B, the UE 110 includes at least one processing unit 220. The processing unit 220 implements various processing operations of the UE 110. For example, the processing unit 220 could perform signal coding, data processing, power control, input/output processing, or any other functionality enabling the UE 110 to operate in the communication system 100. The processing unit 220 also supports the methods and teachings described in more detail herein. Each processing unit 220 includes any suitable processing or computing device configured to perform one or more operations. Each processing unit 220 could, for example, include a microprocessor, microcontroller, digital signal processor, field programmable gate array, or application specific integrated circuit.

The UE 110 also includes at least one transceiver 222. The transceiver 222 is configured to modulate data or other content for transmission by at least one antenna 224. The transceiver 222 is also configured to demodulate data or other content received by the at least one antenna 224. Each transceiver 222 includes any suitable structure for generating signals for wireless transmission and/or processing signals received wirelessly. Each antenna 224 includes any suitable structure for transmitting and/or receiving wireless signals. One or multiple transceivers 222 could be used in the UE 110, and one or multiple antennas 224 could be used in the UE 110. Although shown as a single functional unit, a transceiver 222 could also be implemented using at least one transmitter and at least one separate receiver.

The UE 110 further includes one or more input/output devices 226. The input/output devices 226 facilitate interaction with a user. Each input/output device 226 includes any suitable structure for providing information to or receiving information from a user, such as a speaker, microphone, keypad, keyboard, display, or touch screen.

In addition, the UE 110 includes at least one memory 228. The memory 228 stores instructions and data used, generated, or collected by the UE 110. For example, the memory 228 could store software or firmware instructions executed by the processing unit(s) 220 and data used to reduce or eliminate interference in incoming signals. Each memory 228 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

FIG. 2C illustrates an example base station 114. These components could be used in the system 100, or in any other suitable system. As shown in FIG. 2C, the base station 114 includes at least one processing unit 240, at least one transmitter 246, at least one receiver 244, one or more antennas 248, and at least one memory 242. The processing unit 240 implements various processing operations of the base station 114, such as signal coding, data processing, power control, input/output processing, or any other functionality. The processing unit 240 can also support the methods and teachings described in more detail above. Each processing unit 240 includes any suitable processing or computing device configured to perform one or more operations. Each processing unit 240 could, for example, include a microprocessor, microcontroller, digital signal processor, field programmable gate array, or application specific integrated circuit.

Each transmitter 246 includes any suitable structure for generating signals for wireless transmission to one or more UEs or other devices. Each receiver 244 includes any suitable structure for processing signals received wirelessly from one or more UEs or other devices. Although shown as separate components, at least one transmitter 246 and at least one receiver 244 could be combined into a transceiver. Each antenna 248 includes any suitable structure for transmitting and/or receiving wireless signals. While a common antenna 248 is shown here as being coupled to both the transmitter 246 and the receiver 244, one or more antennas 248 could be coupled to the transmitter(s) 246, and one or more separate antennas 248 could be coupled to the receiver(s) 244. Each memory 242 includes any suitable volatile and/or non-volatile storage and retrieval device(s).

Figure 3:
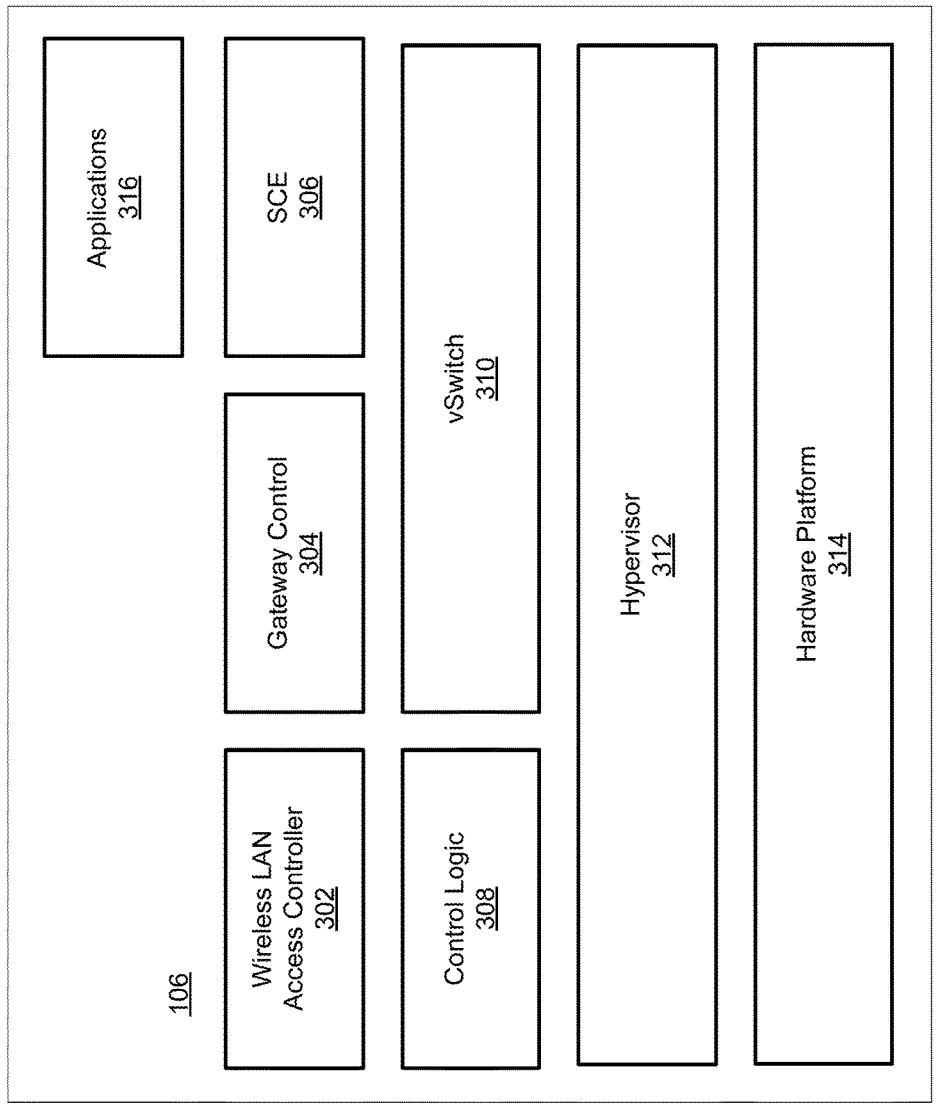
FIG. 3 is a block diagram of one embodiment of a control point.

FIG. 3 is a block diagram of one embodiment of a control point 106. The control point 106 includes hardware platform 314, a Wireless LAN access controller 302, gateway control 304, Service Computation Engine (SCE) 306, control logic 308, virtual switch (vSwitch) 310, hypervisor 312, and applications 316.

The Wireless LAN access controller 302, gateway control 304, Service Computation Engine (SCE) 306, control logic 308, virtual switch (vSwitch) 310, hypervisor 312, applications 316 may all be implemented as software that executes on hardware platform 314. The hardware platform 314 may be implemented with one or more processors, computer-readable non-transitory media, and one or more communication interfaces. FIG. 2A shows one example of such elements.

The hypervisor 312 provides the ability to run multiple virtual machines on one physical machine (such as hardware platform 314). Wireless LAN access controller 302, gateway control 304, Service Computation Engine (SCE) 306, control logic 308, and vSwitch 310 are each a virtual machine, in one embodiment. Thus, in one embodiment, the control point 106 is implemented using virtualization technologies. Virtualization technologies allow one computer to do the job of multiple computers by sharing resources of a single computer across multiple systems.

The vSwitch 310 is a virtual switch that is implemented in software, in one embodiment. In one embodiment, the vSwitch 310 is configured to provide traffic flow management. The vSwitch 310 may be configured to classify traffic and to apply different treatment to different traffic. The vSwitch 310 may be based on an extension to Open vSwitch.

Thus, the vSwitch 310 may implement at least some of the functionality of a network switch. A network switch may be employed to receive, process and forward data packets to their intended destination according to specific flow management protocols (or called data forwarding protocols). Moreover, network switches can have two planes: a control plane and a data plane. The control plane is a portion of the system responsible for providing the flow management protocol functions and features of the system. The data plane is responsible for actually receiving, processing and sending data from and to the ports that connect the switch to external sources according to the logic provided by the control plane. In one embodiment, vSwitch 310 implements the user plane portion of a service gateway. For example, vSwitch 310 may implement functions of a GW-U node in accordance with a 3GPP EPC protocol.

In one embodiment, vSwitch 310 inspects traffic flow to route traffic. The traffic flow management can include routing traffic between a UE 110 and core network 102, between a UE 110 and enterprise network 108, as well as mixed between the core network 102 and the enterprise network 108. Note that the UE 110 may be configured with only a single Access Point Name (APN) and the vSwitch 310 can still route the traffic to different networks, such as the core network 102 and the enterprise network 108, in one embodiment.

The traffic flow management can be based on policies from the core network 102 and/or the enterprise network 108. The traffic flow management may be based on location of the UE 110. The location could be determined based on the base station 114 to which the UE 110 is connected, a physical location of the UE 110, or some other location identifier. Basing traffic flow management on the location of the UE 110 could be used to push information to a user, based on their location, as one example. For example, an advertisement or coupon could be pushed to a user based on the retail store the person is in or near. The traffic flow management may be based on a user associated with the UE 110. For example, traffic flow management may be based on a group to which the user belongs. For example, access to a local wireless network could be limited to users who are employees of a company. Thus, the policies may be adapted to a local venue served by the radio access nodes.

Gateway control 304 provides a gateway control function, in one embodiment. In one embodiment, gateway control 304 implements the control functions of a service gateway. In one embodiment, gateway control 304 implements the control plane portion of a service gateway. In one embodiment, gateway control 304 implements a portion of a 3GPP standard in order to provide a control plane portion of a service gateway. For example, gateway control 304 may implement the control portions of a service gateway (S-GW) in a 3GPP EPC architecture (e.g., LTE). However, note that gateway control 304 is not limited to 3GPP or to being an S-GW.

Wireless LAN Access Controller 302 provides wireless LAN access, in one embodiment. In one embodiment, Wireless LAN Access Controller 302 provides for Wi-Fi access. The Wireless LAN Access Controller 302 is compliant with an IEEE 802.11 standard, in one embodiment.

The control point 106 thus may provide support for a wide variety of radio technologies. Other virtual machines may be added to the control point 106 to provide for other radio technologies. Also, Wi-Fi and LTE as described with respect to access controller 302, gateway control 304, and vSwitch 310 are two examples. The control point 106 is not required to support either of these radio technologies.

Control logic 308 implements the control between the base stations 114 and a management entity in the core network 102, in one embodiment. Control logic 308 implements the control between the base stations 114 and an MME in the core network 102, in one embodiment. Control logic 308 is compliant with an S1-MME interface of an LTE protocol, in one embodiment. However, note that control logic 308 is not limited to LTE or an S1-MME interface.

The SCE 306 receives policies from operator core network 102 and/or enterprise network 108, in one embodiment. The Service Computation Engine (SCE) 306 is configured to provide instructions for the vSwitch 310 based on these policies, in one embodiment. For example, the SCE could program the vSwitch 310.

In one embodiment, SCE 306 includes an SDN (Software Defined Networking) controller. In one embodiment, the SDN is implemented with a version of ONOS (Open Network Operating System).

The applications 316 may be any software application. In one embodiment, the control point 106 hosts third party applications. Applications 316 are not a required part of the control point 106. Another option is for the applications 316 to be hosted by a server in the enterprise network 108.

Figure 4:
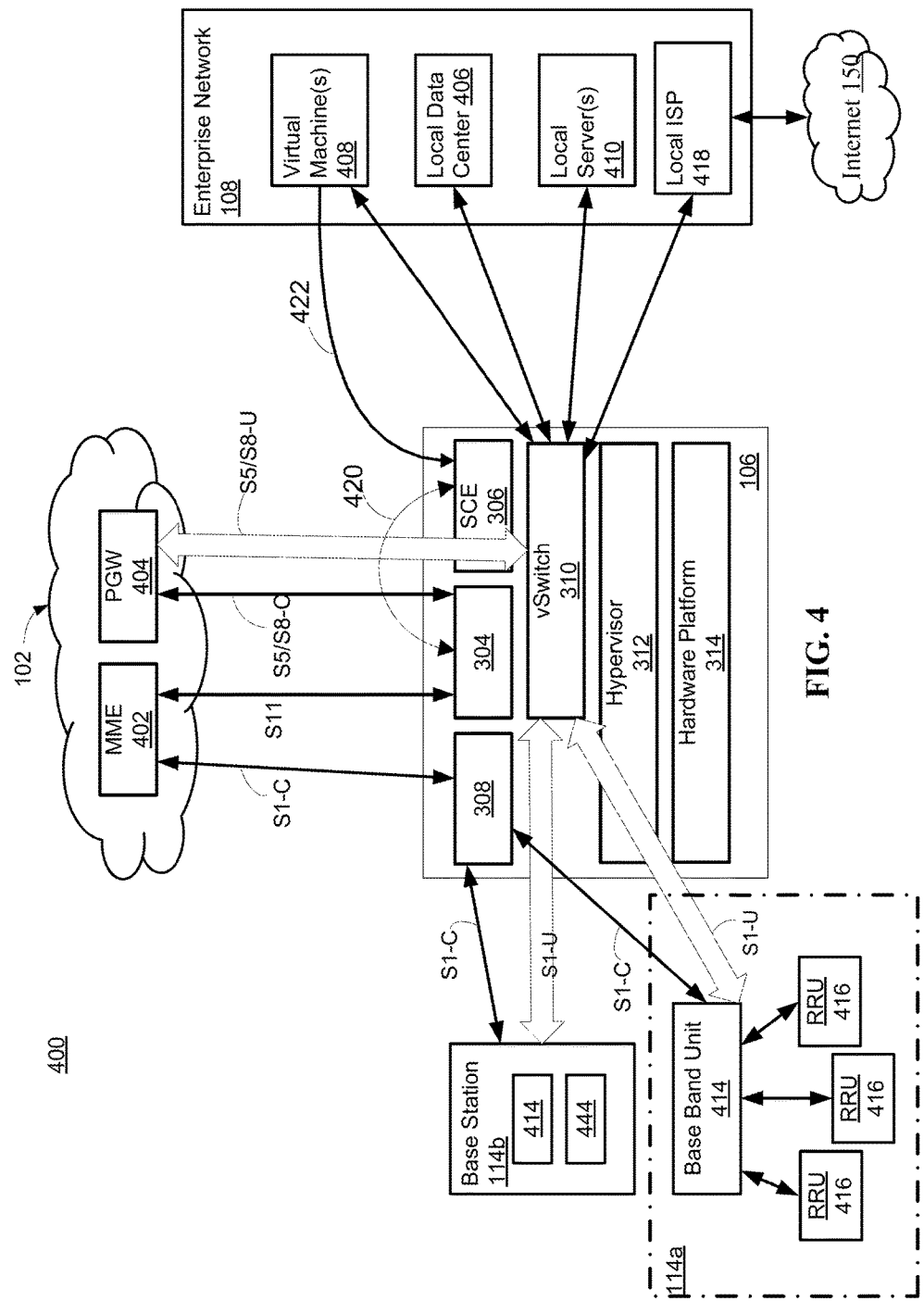
FIG. 4 depicts a communication system having one embodiment of a control point.

FIG. 4 depicts a communication system 400 having one embodiment of a control point 106. FIG. 4 shows the control point 106 mediating between the core network 102 and enterprise network 108. In this example, the enterprise network 108 comprises one or more physical local servers 410, a local data center 406, and one or more virtual machines 408.

The virtual machine(s) 408 may communicate with the SCE 306 using, for example, API calls 422. In one embodiment, virtual machine(s) 408 use a Northbound API as the term is commonly used with respect to SDN. However, the virtual machine(s) 408 may communicate with an API other than one used with respect to SDN. The virtual machine(s) 408 may provide policies to the SCE 306 for traffic flow management. As one example, a policy could specify a range user IDs and/or range of destination IP addresses for which traffic should be routed by the vSwitch 310 to the local server(s) 410. The policies may be set by the operator for a local venue such as, but not limited to, a sports venue, workplace, airport, or shopping center.

SCE 306 has an interface 420 to gateway control 304. In one embodiment, every time that a UE 110 attaches to the network (e.g., attaches a base station 114 connected to control point 106) or does a handover from one base station 114 to another, the gateway control 304 sends a signal to the SCE 306. Thus, the SCE 306 may use this information about the location and/or connection of the UE 110 when deciding how to enforce a policy. In the example of FIG. 4, the core network 102 has an MME 402 and a PGW 404. In this example, the core network 102 may be compliant with an EPC architecture.

The MME 402 in the core network 102 may be the main signaling node in the EPC. The MME 402 may be responsible for initiating paging and authentication of the mobile device. The MME 402 communicates control information with control logic 308 using an S1-C interface in this example. The MME 402 communicates control information with gateway control 304 using an S11 interface in this example.

PGW 404 in the core network 102 is a packet gateway. In one embodiment, the PGW 404 is used to route traffic from the vSwitch 310 back to the core network 102. PGW 404 communicates control information with gateway control 304 using an S5/S8-C interface in this example. PGW 404 communicates user data with vSwitch 310 using an S5/S8-U interface in this example. The interfaces (S1-C, S11, S5/S8-C, S5/S8-U) refer to a 3GPP protocol. However, the control point 106 could interface to the core network 102 using other interfaces. Thus, in a different embodiment, the interfaces are not 3GPP interfaces.

FIG. 4 shows two examples of how the base station 114 might be implemented. Note that both are not required to be used. In a distributed technique, the base station is referred to with reference numeral 114a. In the distributed technique, the Baseband Unit (BBU) 414 is physically separate from remote radio units (RRU) 416. The BBU 414 may implement all of the radio protocols. In the example in FIG. 4, the BBU 414 communicates control information with the control logic 308 in the control point 106 using an S1-C interface. In the example, the BBU 414 communicates user data with the vSwitch 310 in the control point 106 using an S1-U interface. In one embodiment, BBU 414 presents itself as a single base station (e.g., eNodeB) to the core network 102. The interfaces (S1-C, S1-U) refer to a 3GPP protocol. The BBU 414 and control point 106 could use interfaces other than S1-C and S1-U depending on the radio protocol being implemented.

The connection between the BBU 414 and the RRUs 416 may be made via optical fiber. Each RRU 416 can include an antenna, an A/D, and a DAC. An RRU 416 may sample the radio interface and send data to the BBU 414. Likewise, an RRU 416 may receive data from the BBU 414 and transmit it over using its antenna. In this implementation, the combination of the BBU 414 and RRUs 416 may be considered to be a distributed base station 114a. The RRUs 416 are examples of radio access nodes.

In an integrated technique, the base station 114b contains a base band unit 414 and a radio unit 444. The radio unit 444 is an example of a radio access node. Note that there may be many such integrated base stations 114b connected to the control point 106. In one embodiment, each integrated base station 114b implements an eNode B. Note that in this example, each integrated base station 114b may separately communicate control information with the control logic 308 using an S1-C interface. Also, the integrated base station(s) 114b may each communicate user data with the vSwitch 310 in the control point 106 using an S1-U interface. The integrated base station(s) 114b could use interfaces other than S1-C and S1-U depending on the radio protocol being implemented.

The vSwitch 310 is configured to perform traffic flow management based on instructions from SCE 306, in one embodiment. The vSwitch 310 may route certain traffic to the enterprise network 108. This may be based on local policies from the enterprise network 108 and/or policies from the core network 102. For example, certain traffic can get routed to/from the local servers 410. Data could be accessed from the local data center 406. The vSwitch 310 can route traffic to a local ISP (Internet Service Provider) 418 such that local Internet service can be provided to a UE 110 connected to radio unit 444 or one of the RRUs 416 (without going through the core network 102). In other words, local Internet service can be provided to a UE 110 connected to one of the base stations 114 without going through the core network 102. The vSwitch 310 can route traffic to a login portal (not depicted in FIG. 4) in the enterprise network 108. The login portal may be used for login to a Wi-Fi network, but a login portal could be used for other radio technologies.

Figure 5B:
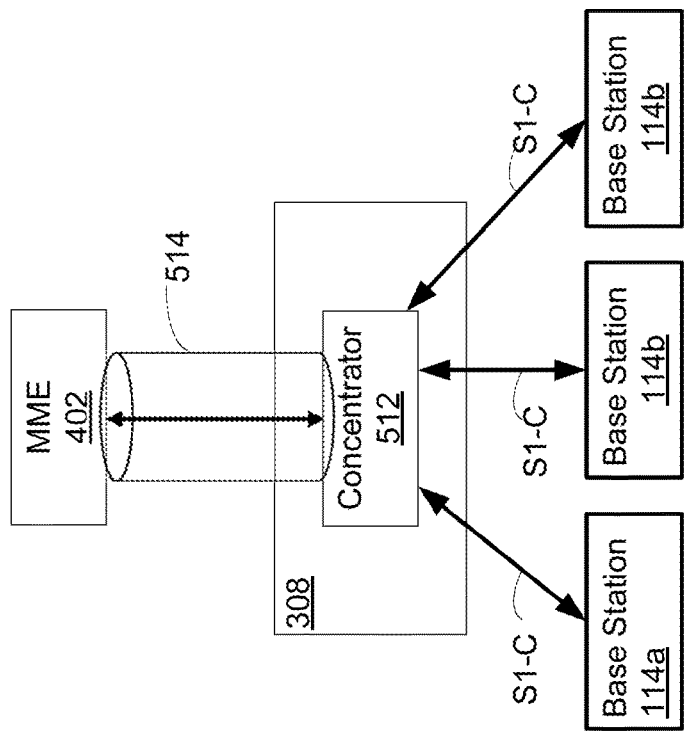
FIGS. 5A and 5B show an aggregator and a concenter option.
Figure 5A:
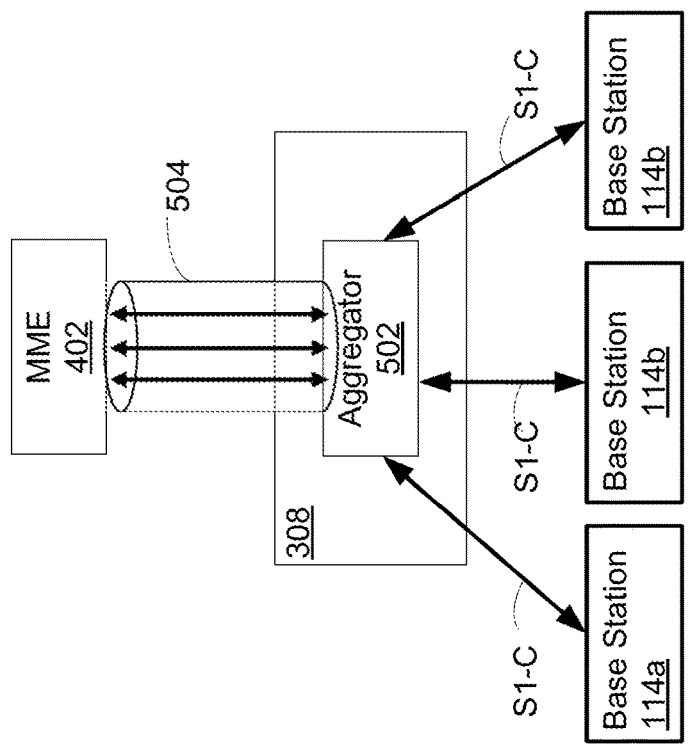

In one embodiment, the control logic 308 of FIG. 4 implements an aggregator (e.g., S1-C aggregator). In one embodiment, the control logic 308 of FIG. 4 implements a concentrator (e.g., S1-C concentrator). FIGS. 5A and 5B, respectively show these two options.

In FIG. 5A, the control logic 308 implements an aggregator 502. This is an S1-C aggregator, in one embodiment. Tunnel 504 provides communication between aggregator 502 and the MME 402. Note that MME 402 may be located in the core network 102. The tunnel 504 is implemented with IPSec, in one embodiment. The aggregator 502 interfaces with the distributed base station 114a and integrated base stations 114b using an S1-C interface, in this example. Note that in the example of FIG. 5A, the MME 402 may see many eNodeBs. Recall that distributed base station 114a may present itself as a single eNodeB even though there may be many RRUs 416 in distributed base station 114a. On the other hand, each integrated base station 114b may present itself as a separate eNodeB. However, there may be many integrated base stations 114b connected to control point 106. Thus, the aggregator may work well when there is one or a few distributed base stations 114a connected to the control point 106. The aggregator 502 may also work well if there are a few integrated base stations 114b. Note that it is not required to have both distributed base stations 114a and integrated base stations 114b when using the aggregator 502.

In FIG. 5B, the control logic 308 implements a concentrator 512. This is an S1-C concentrator, in one embodiment. Tunnel 514 provides communication between concentrator 512 and the MME 402. Note that MME 402 may be located in the core network 102. The tunnel 514 is implemented with IPSec, in one embodiment. The concentrator 512 interfaces with the distributed base station 114a and the integrated base stations 114b using an S1-C interface, in this example. Note that in the example of FIG. 5B, the MME 402 may see a single eNodeB even if there are many eNodeBs on the other side of the concentrator 512. Thus, the concentrator 512 may work well when there are multiple distributed base stations 114a, or multiple integrated base stations 114b. In one embodiment, the base stations 114a, 114b in the example of FIG. 5B use home eNodeB identifies (HeNBID). Note that it is not required to have both distributed base stations 114a and integrated base stations 114b when using the concentrator 512.

Figure 6:
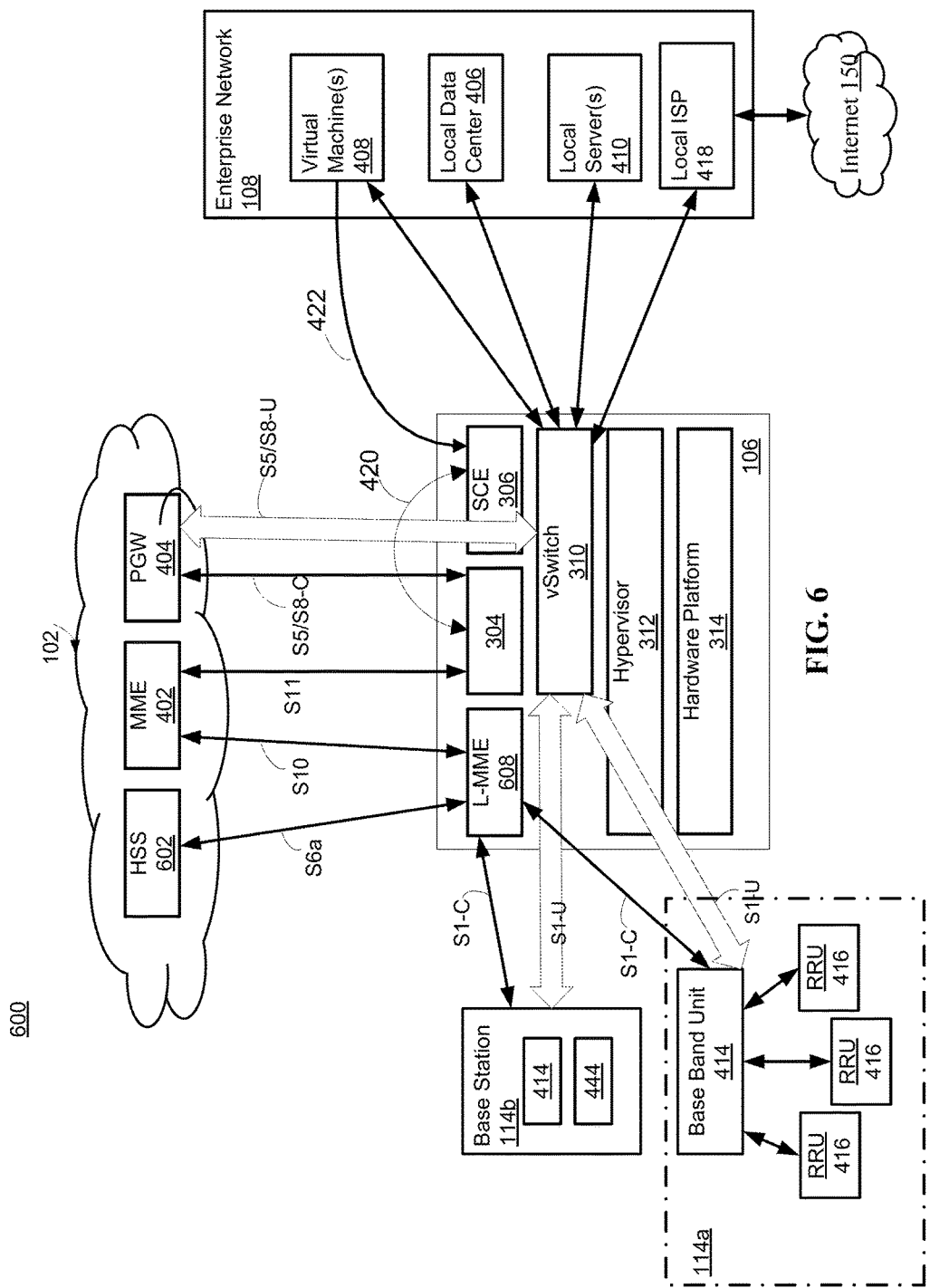
FIG. 6 depicts a communication system in which the control point has a local MME.

Recall that in FIG. 4, the MME 402 is in the core network 102. In one embodiment, there is an MME at the control point 106. Thus, there may be an MME outside of the core network 102, at the local venue. FIG. 6 depicts a communication system 600 in which the control point 106 has a local MME (L_MME) 608. In one embodiment, the L_MME 608 handles handovers over of UEs 110 between base stations 114. The L_MME 608 communicates with the MME 402 in the core network 102 using an S10 interface, in this example. The L_MME 608 communicates with the HSS 602 in the core network 102 using an S6a interface, in this example. The interfaces (S10, S6A) refer to a 3GPP protocol. Different interfaces could be used depending on the radio protocol being implemented.

Similar to the control logic 308 in FIG. 4, the L_MME 608 interfaces with the base station 114 and BBU 414 using an S1-C and S1-U interfaces, previously discussed. Other elements may be similar to FIG. 4 and will not be discussed in detail.

Figure 7:
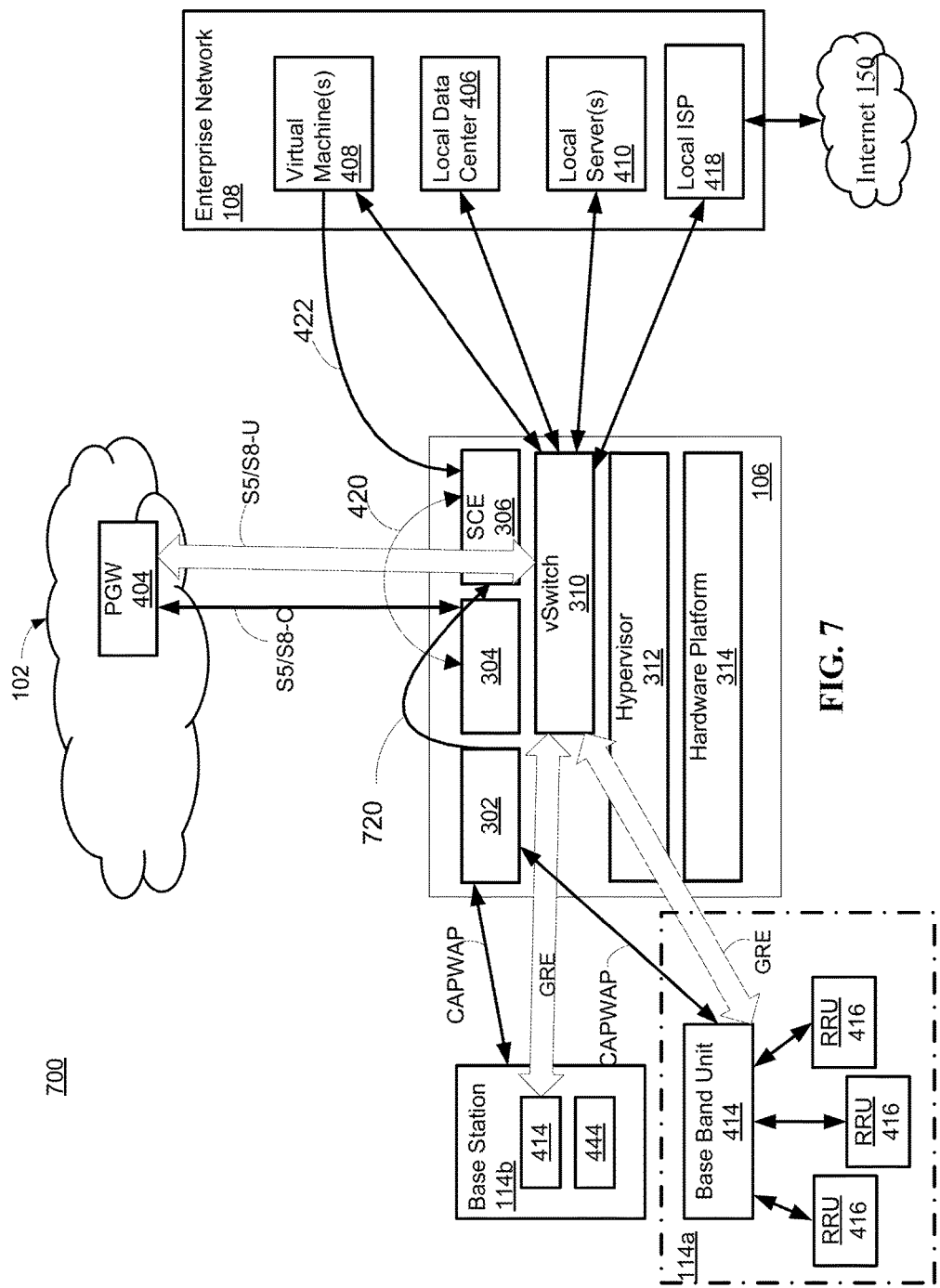
FIG. 7 shows an embodiment in which the control point has a wireless LAN access controller.

In FIG. 4, the control point 106 has many of the elements of the embodiment of FIG. 3. However, the wireless LAN access controller 302 was not depicted in FIG. 4. FIG. 7 shows an embodiment in which the control point 106 has a wireless LAN access controller 302. However, the control logic 308 is not depicted in FIG. 7. Note that this is because the embodiment of FIG. 7 emphasizes the wireless LAN interfaces. Since many elements between FIG. 7 are common with FIG. 4, common elements will not be described in detail.

FIG. 7 shows the wireless LAN access controller 302, the SCE 306 (which may include an SDN controller) and the gateway control 304 working together. In one embodiment, the wireless LAN access controller 302 is a Wi-Fi access controller. In one embodiment, the gateway control 304 is a Wi-Fi access controller. In one embodiment, gateway control 304 implements the control plane portion of a service gateway. In one embodiment, gateway control 304 implements a portion of a 3GPP standard in order to provide a control plane portion of a service gateway. For example, gateway control 304 may implement the control portions of a service gateway (S-GW) in a 3GPP EPC architecture (e.g., LTE).

FIG. 7 shows a communication system 700 in which the wireless LAN access controller 302 communicates control signals with the base band unit 414 (in integrated base station 114b and in distributed base station 114a) using a CAPWAP (Control and Provisioning of Wireless Access Points) protocol. FIG. 7 shows an example in which the wireless LAN access controller 302 communicates data with the base band unit(s) 414 using a GRE (Generic Routing Encapsulation) protocol. Both CAPWAP and GRE are examples, other protocols could be used.

As with the example of FIG. 4, PGW 404 communicates control information with gateway control 304 using an S5/S8-C interface in this example. PGW 404 communicates user data with vSwitch 310 using an S5/S8-U interface in this example. The interfaces (S1-C, S11, S5/S8-C, S5/S8-U) refer to a 3GPP protocol. Note that this allows for Wi-Fi traffic to be routed from vSwitch 310 to core network 102 via the S5/S8-U interface. Thus, the vSwitch 310 may use the data plane of a wireless communication protocol used by the core network 102 and the data plane of a wireless communication protocol of the wireless LAN controller 302 to transfer data between the core network 102 and radio access nodes of the base stations 114. However, the control point 106 could interface to the core network 102 using other interfaces than shown in FIG. 7. Thus, in a different embodiment, the interfaces are not 3GPP interfaces. Note that the MME 402 is not depicted in the core network 102, in FIG. 7.

The wireless LAN access controller 302 communicates to the SCE 306 over interface 720. In this example, the communication is one way (from the wireless LAN access controller 302 to the SCE 306). However, it is possible to have a variation in which SCE 306 sends information to wireless LAN access controller 302.

The wireless LAN access controller 302 could communicate similar information to the SCE 306 that control logic 308 provides to SCE 306. For example, the LAN access controller 302 could inform the SCE 306 which access point a UE 110 has connected to. In one embodiment, every time that a UE 110 attaches to the network or does a handover from one base station 114 to another (or in some cases from one RRU 416 to another RRU 416), the wireless LAN access controller 302 sends a signal to the SCE 306. Thus, the SCE 306 may use this information about the location and/or connection of the UE 110 when deciding how to enforce a policy.

As with the discussion of FIG. 4, the enterprise network 108 may send policies to SCE 306 using, for example, API calls. In one embodiment, virtual machine(s) 408 use a Northbound API as the term is commonly used with respect to SDN.

As with the discussion of FIG. 4, the vSwitch 310 in FIG. 7 may be configured to perform traffic flow management based on instructions from SCE 306. The vSwitch 310 may route certain traffic to the enterprise network 108. This may be based on local policies from the enterprise network 108 and/or policies from the core network 102. For example, certain traffic can get routed to/from the local servers 410. Data could be accessed from the local data center 406. Local Internet service can be provided to a UE 110 connected to base station 114 or one of the RRUs 416 (without going through the core network 102).

Figure 8:
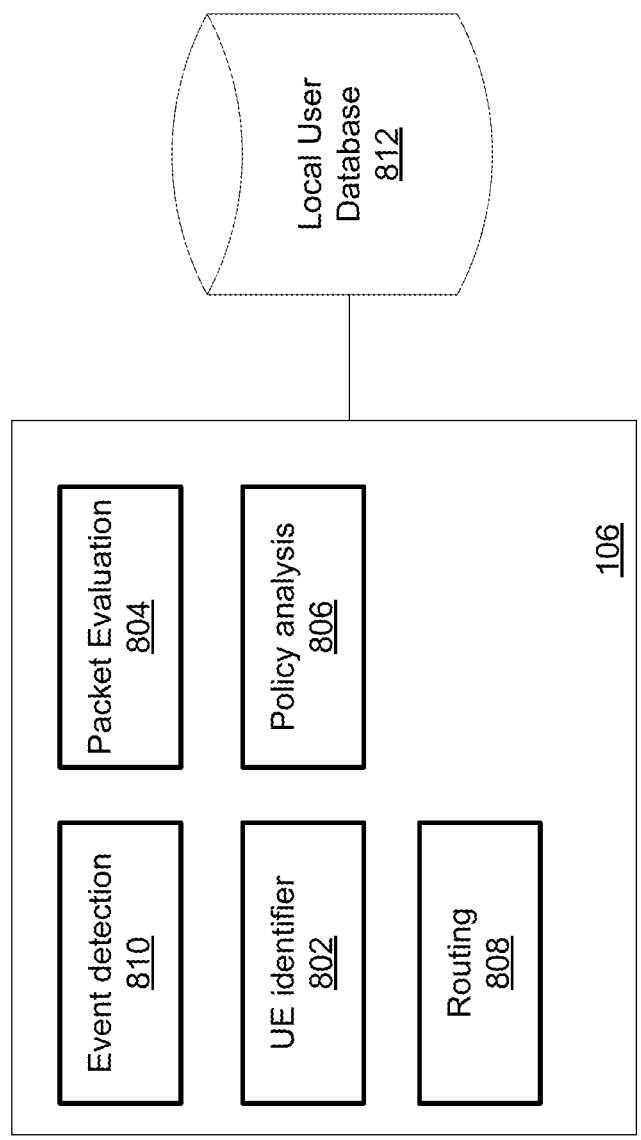
FIG. 8 is a block diagram of various logic included in one embodiment of a control point.

FIG. 8 is a block diagram of various logic included in one embodiment of a control point 106. The logic may be used to perform various functions. The control point 106 includes UE identifier 802, packet evaluation 804, policy analysis 806, routing 808, and event detection 810. The control point 106 has access to a local user database 812, which may include information similar to an HSS.

The local user database 812 may contain policies for traffic flow management. The policies may be adapted to a local venue served by radio access nodes of the base stations 114. In one embodiment, some of the policies are based on the identity of the user. In one embodiment, the venue or enterprise associated with the enterprise network 108 issues a SIM card to users for their UEs 110. This may be referred to herein as an "enterprise SIM card". This enables the user to be identified in order to index the local user database 812. However, it is not required to issue an enterprise SIM card to the users of the UEs 110. Instead, the SIM information could be maintained in a database in the core network 102 (e.g., HSS database). In this case, the operator of the core network 102 may provide the enterprise associated with the enterprise network 108 with information that helps to identify the UEs 110 of users.

In one embodiment, UE identifier 802 identifies a UE 110 or person associated with the UE 110. In one embodiment, UE identifier 802 sends identifiers of the UEs and/or users associated therewith to policy analysis 806. In one embodiment, event detection 810 detects an event such as a UE 110 connecting to the network via a base station 114 or a hand-off from one base station 114 to another. In one embodiment, event detection 810 sends the events to policy analysis 806. In one embodiment, UE identifier 802 and event detection 810 are implemented by wireless LAN access controller 302. In one embodiment, UE identifier 802 and event detection 810 are implemented by control logic 308.

In one embodiment, policy analysis 806 analyzes policies provided by the enterprise network 108 and/or core network 102 to determine how to perform traffic management. In one embodiment, policy analysis 806 is implemented by SCE 306.

In one embodiment, packet evaluation 804, analyzes packets, which can be used to determine how to route the packets. In one embodiment, routing 808 perform the routing of packets based on the results of policy analysis. In one embodiment, packet evaluation 804 is implemented by SCE 306 after receiving a packet from vSwitch 310. In one embodiment, routing 808 is implemented by vSwitch 310.

The UE identifier 802, packet evaluation 804, policy analysis 806, routing 808, and event detection 810 are implemented in software, in one embodiment. For example, the UE identifier 802, packet evaluation 804, policy analysis 806, routing 808, and event detection 810 may be implemented by one or more virtual machines, which execute on a hardware platform.

The UE identifier 802, packet evaluation 804, policy analysis 806, routing 808, and event detection 810 are implemented in hardware, in one embodiment. For example, rather than using software, dedicated hardware may be used to implement them. Note that some functions can be implemented entirely by software and others entirely by hardware. For example, policy analysis 806 might be implemented entirely in software, whereas routing 808 might be implemented entirely by dedicated hardware (such as a hardware network switch). Each of UE identifier 802, packet evaluation 804, policy analysis 806, routing 808, and event detection 810 could be implemented with some combination of software and hardware.

Figure 9A:
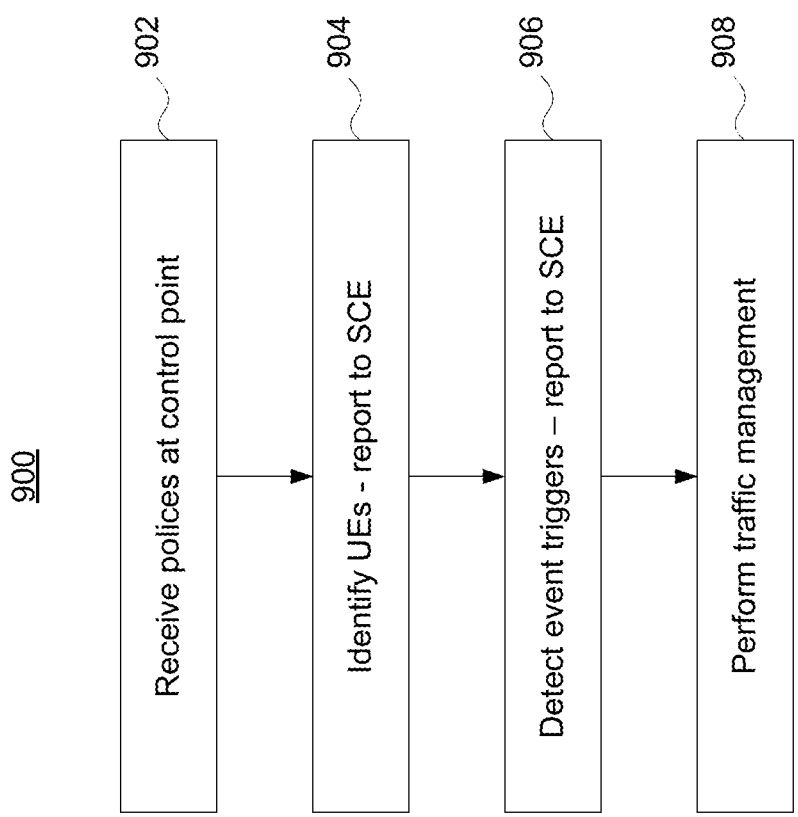
FIG. 9A is a flowchart of one embodiment of a process of providing local control for a wireless network.

FIG. 9A is a flowchart of one embodiment of a process 900 of providing local control for a wireless network. The process 900 could be implemented by control point 106 of FIG. 1, 3, 4, 6, 7, or 8, but is not limited to those examples. In step 902, the control point 106 receives policies from enterprise network 108 and/or core network 102. These policies are adapted to a local venue, in one embodiment.

FIG. 9B shows one example of local policy. The example policy shows a group name 922, member list 924, valid locations 926, allowed local breakout (LBO) destination 928, allowed home routed destination 930, and blocked destination 932. The member list 924 has an IMSI (International Mobile Subscriber Identity), which may be used in connection with the communication system 400 in FIG. 4. The member list 924 has an NAI (Network Access Identifier), which may be used in connection with the communication system 700 in FIG. 7. The valid locations 926 indicates the base stations 114 to which the policy applies. The allowed LBO destination 928 indicates a destination in the enterprise network 108 that the group members are permitted to access. The allowed home routed destination 930 indicates a destination in the core network 102 that the group members are permitted to access. The blocked destination 932 indicates a destination that the group members are not permitted to access. This is just one example of a local policy.

In step 904, the control point 106 identifies UEs 110 that are connected to the wireless network via a base station 114 to which the control point 106 is connected. In one embodiment, the identifiers of the UEs 110 are reported to the SCE 306. The UEs 110 may be identified in number of ways including, but not limited to, IMSI, IMEI, NAI, MAC, or user name.

In step 906, the control point 106 detects events with respect to the UEs 110. Examples of the events include, but are not limited to, a UE 110 connecting to the wireless network, a UE 110 disconnecting from the wireless network, and a hand-off of a UE 110 from one base station 114 to another. In one embodiment, the events are reported to the SCE 306.

In one embodiment, step 904 and/or step 906 includes adding/removing a UE 110 as a member to a group in accordance with the policies. In one embodiment, step 904 and/or step 906 includes adding/removing a home routed destination in accordance with the policies. In one embodiment, step 904 and/or step 906 includes adding/removing a local service routed destination in accordance with the policies. In one embodiment, step 904 and/or step 906 includes adding/removing a blocked destination in accordance with the policies.

In step 908, the control point 106 performs traffic management. In one embodiment, traffic management is based on policies from the enterprise network 108. In one embodiment, traffic management is based on the identifiers of the UEs 110. In one embodiment, traffic management is based on the events.

Step 908 may include the SCE 306 instructing the vSwitch 310 how to process traffic (e.g., packets) in order to perform the traffic management. Note that in some embodiments, rather than (or in addition to) having a vSwitch 310, a physical network switch is used to perform the traffic management. The physical network switch does not run on the hardware platform 314 that supports the vSwitch 310, in accordance with embodiments. Thus, step 908 may include the SCE 306 instructing a physical network switch how to route traffic, in one embodiment.

Examples of performing traffic management include routing traffic. Examples include routing based on using a shortest path, routing using a link cost metric, routing using load information. Performing traffic management may also include allocating link bandwidth to, for example, provide a guaranteed bit rate (GBR). Performing traffic management may also include blocking traffic that does not comply with a policy (such as a security policy). Other examples of performing traffic management are discussed below in connection with FIGS. 10, 12, 13, 14, 15, 16, 17, 18, 19, and 20.

Figure 10:
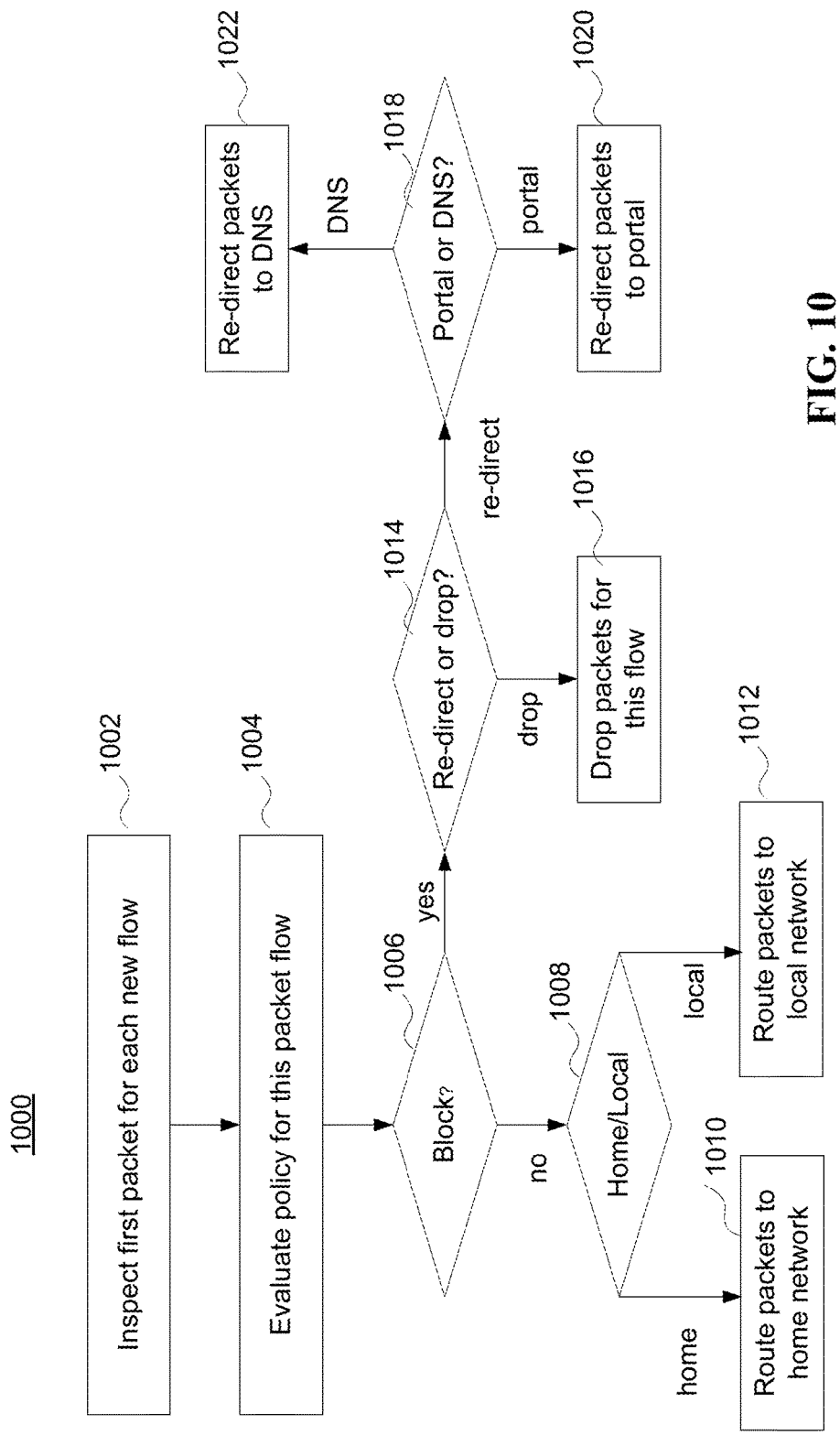
FIG. 10 is a flowchart of one embodiment of a process of routing traffic by a control point.

FIG. 10 is a flowchart of one embodiment of a process 1000 of routing traffic by a control point 106. In one embodiment, the process 1000 may be performed for each new packet flow going through the control point 106. In step 1002, the control point 106 inspects the first packet of the new flow. This new flow is for when a UE 110 opens a connection to a new destination on enterprise network 108 or Internet 150. However, the new flow is not limited to this example.

In step 1004, the control point 106 evaluates policies for the new flow, based on the contents of the packet.

Step 1006 includes a determination of whether to block this flow. If the flow is not blocked, then the control point determines whether the traffic is to be routed to the home network (e.g., core network 102) or locally (e.g., enterprise network). Depending on the decision, the packets in this flow are routed accordingly in steps 1010 or 1012.

Returning to the discussion of step 1006, if the decision is to block the traffic flow, then a decision is made whether the traffic flow should be re-directed or dropped (step 1014). One possibility is to drop the packets for this flow (step 1016). If the packets are not to be dropped, then a determination is made how to re-direct the packets in this flow. Step 1018 is a determination whether to re-direct the packet flow to the portal or to the DNS. Packets in this flow are re-directed according in either step 1022 (to DNS) or in step 1012 (to portal).

Figure 11A:
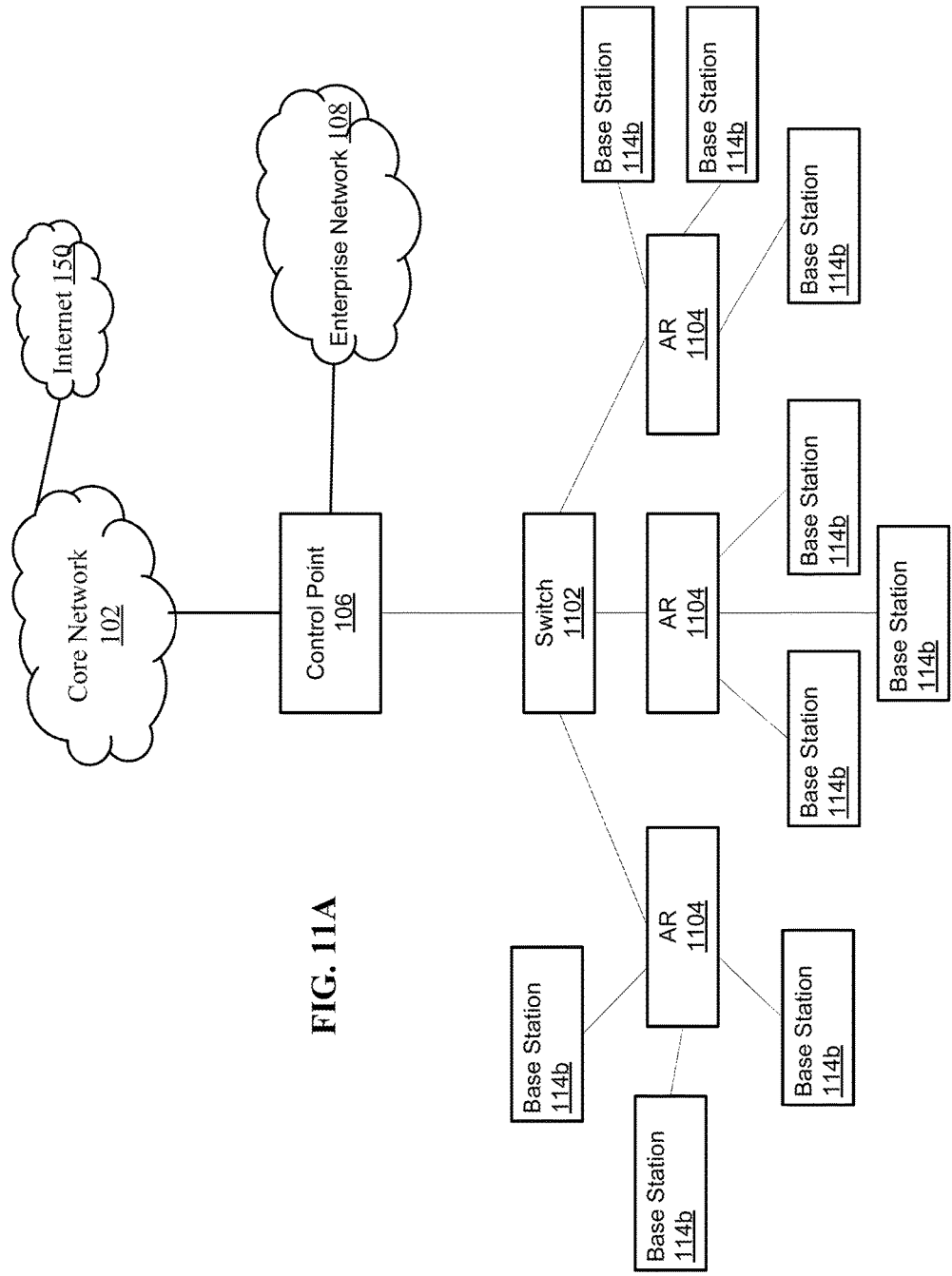
FIG. 11A is a diagram of a communication system showing one possible configuration of a RAN connected to a control point.

FIG. 11A is a diagram of a communication system 1100 showing one possible configuration of a RAN connected to a control point 106. In this configuration, the control point 106 is connected to switch 1102 in a RAN. The switch 1102 is connected to several access routers (AR) 1104. Each access router 1104 is connected to several integrated base stations 114b.

In one embodiment, the access router 1104 is an IP switch or an Ethernet router. In one embodiment, the base station 114*b* has an antenna and a baseband unit. In one embodiment, the base station 114*b* is an LTE base station. In one embodiment, the base station 114*b* is an eNodeB.

As one example implementation, the switch 1102 resides in a basement of an office building. The access routers 1104 may reside in closets on different floors of the office building. The base station 114*b* that connect to a given access router 1104 may all be on the same floor of the building. This is just for purpose of illustration. Many other configurations are possible.

Note that in one embodiment, the vSwitch 310 resides in the control point 106. Another option is to place a vSwitch 310 in the access routers 1104. This allows local breakout of traffic to occur without having to go through switch 1102. Note that the SCE 306 may still reside on the other side of the switch 1102 from the access routers 1104. Note that, in effect, this results in the control point 106 being extended to include the access routers 1104. Note that the vSwitches 310 in the access routers 1104 may be in addition to, or instead of, having the vSwitch 310 on the other side of switch 1102. Also, note that the switch in an access router 1104 could be implemented with a physical network switch instead of a software implemented switch.

Figure 11B:
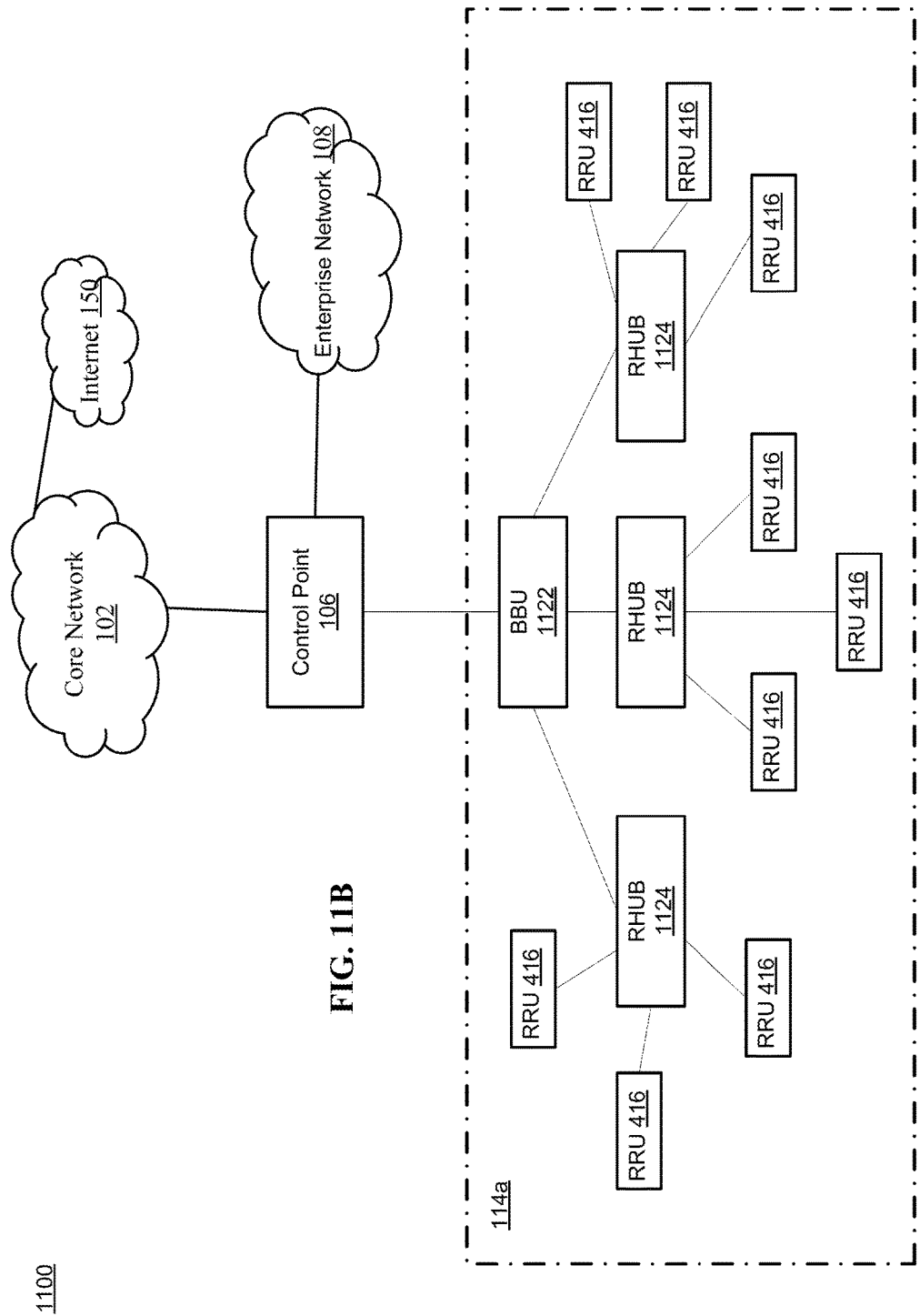
FIG. 11B is a diagram of a communication system showing another possible configuration of a RAN connected to a control point.

FIG. 11B is a diagram of a communication system 1100 showing another possible configuration of a RAN connected to a control point 106. In this example, the control point 106 is connected to a distributed base station 114*a*. In one embodiment, distributed base station 114*a* of FIG. 11B implements a single eNodeB. Note that there could be more than one distributed base station 114*a* connected to the control point 106.

In the configuration of FIG. 11B, the control point 106 is connected to base band unit (BBU) 1122 in distributed base station 114*a*. The BBU 1122 is connected to several radio hubs (RHUB) 1124 in distributed base station 114*a*. Each RHUB 1124 is connected to remote radio units (RRU) 416 in distributed base station 114*a*. In one embodiment, the RHUB 1124 is an optical switch. In one embodiment, the RHUB 1124 is a Common Public Radio Interface (CPRI) switch.

As one example implementation, the BBU 1122 resides in a basement of an office building. The RHUBs 1124 may reside in closets on different floors of the office building. The RRUs 416 that connect to a given RHUB 1124 may all be on the same floor of the building. This is just for purpose of illustration. Many other configurations are possible.

In FIGS. 11A and 11B a single core network 102 is depicted. However, there may be more than one core network 102 in each case. In FIG. 11B there could be a separate BBU 1122 for each core network 102. In one such embodiment, each core network 102 uses its own wireless RF spectrum. However, it is possible for the same BBU 1122 to be used for more than one core network 102. In one such embodiment, core networks 102 that share a BBU 1122 also share the wireless RF spectrum.

When there is more than one core network 102, the SCE 306 may obtain the PLMNID (Public Land Mobile Network Identifier) from the gateway controller 304. The PLMNID may be used by the vSwitch 310 to route the traffic to the appropriate core network 102.

Figure 12:
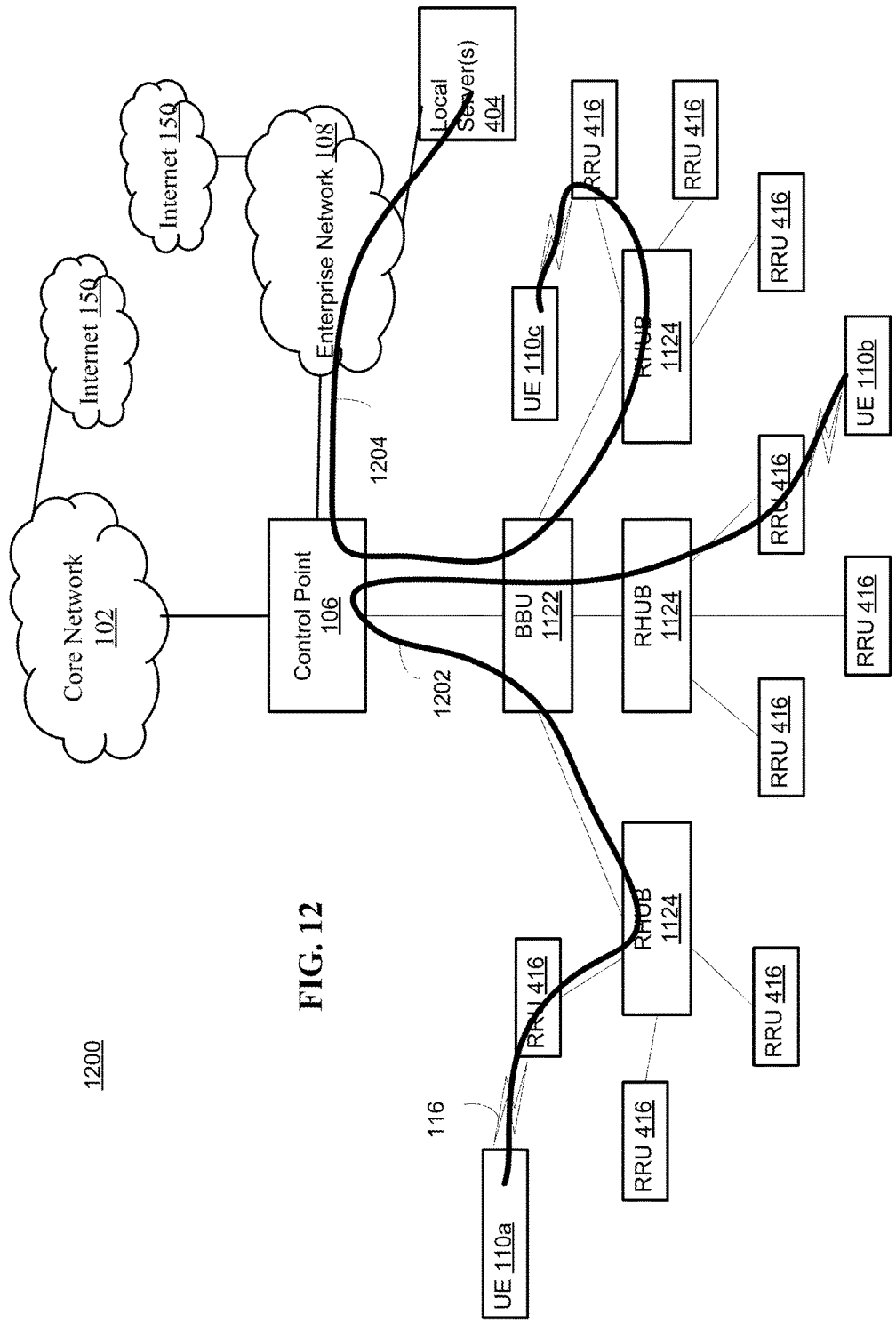
FIG. 12 is a diagram of a communication system showing the control point routing traffic.

In one embodiment, the control point 106 provides for local VLAN service. This may permit direct access to local intranet servers in the enterprise network 108. It may also allow peer connectively between UEs 110. Furthermore, one possibility is to have direct access to the Internet 150 through the enterprise network 108. FIG. 12 provides an example of each of these aspects. UE 110*a* has a peer-to-peer connection 1202 with UE 110*b*. UE 110*c* has direct access to local server 404 as depicted by route 1204. That is, the connection does not need to pass through core network 102. Local server 404 could provide a variety of services including, but not limited to, email. Note that one possibility is to have direct access to the Internet 150 through the enterprise network 108. This, the UEs 110 do not need to go through the core network 102 to gain Internet access.

The control point 106 in FIG. 12 could have components for LTE and/or Wi-Fi as discussed in connection with FIGS. 4 and 7, respectively. However, the control point 106 is not limited to those radio technologies. Note that whatever radio technologies the control point 106 is configured to work with (e.g., LTE, Wi-Fi, etc.) may be bridged onto a common local Ethernet.

Note that the example in FIG. 12 is of a distributed base station connected to the control point 106. The communication system 1200 can be modified to operate with several integrated base stations connected to the control point 106.

In one embodiment, each UE 110 is assigned and generated a virtual Ethernet MAC address. This virtual Ethernet MAC address may be used to represent the UE 110 on an Ethernet LAN. Therefore, in one embodiment, a UE 110 may be provided with a virtual presence on an Ethernet LAN. Thus, other devices may view the UE 110 as an Ethernet host. The control point 106 may run a DHCP client on behalf of the UEs 110 to obtain a local IP address. In one embodiment, the control point 106 has an ONOS (which could be part of SCE 306) that runs the DHCP client. The ONOS may perform a proxy ARP (Address Resolution Protocol) for the UEs 110. This may include finding MAC addresses of destinations, as well as answering requests from other endpoints. In one embodiment, the control point 106 (e.g., ONOS) creates Ethernet headers to add to packets of LTE users.

Figure 13:
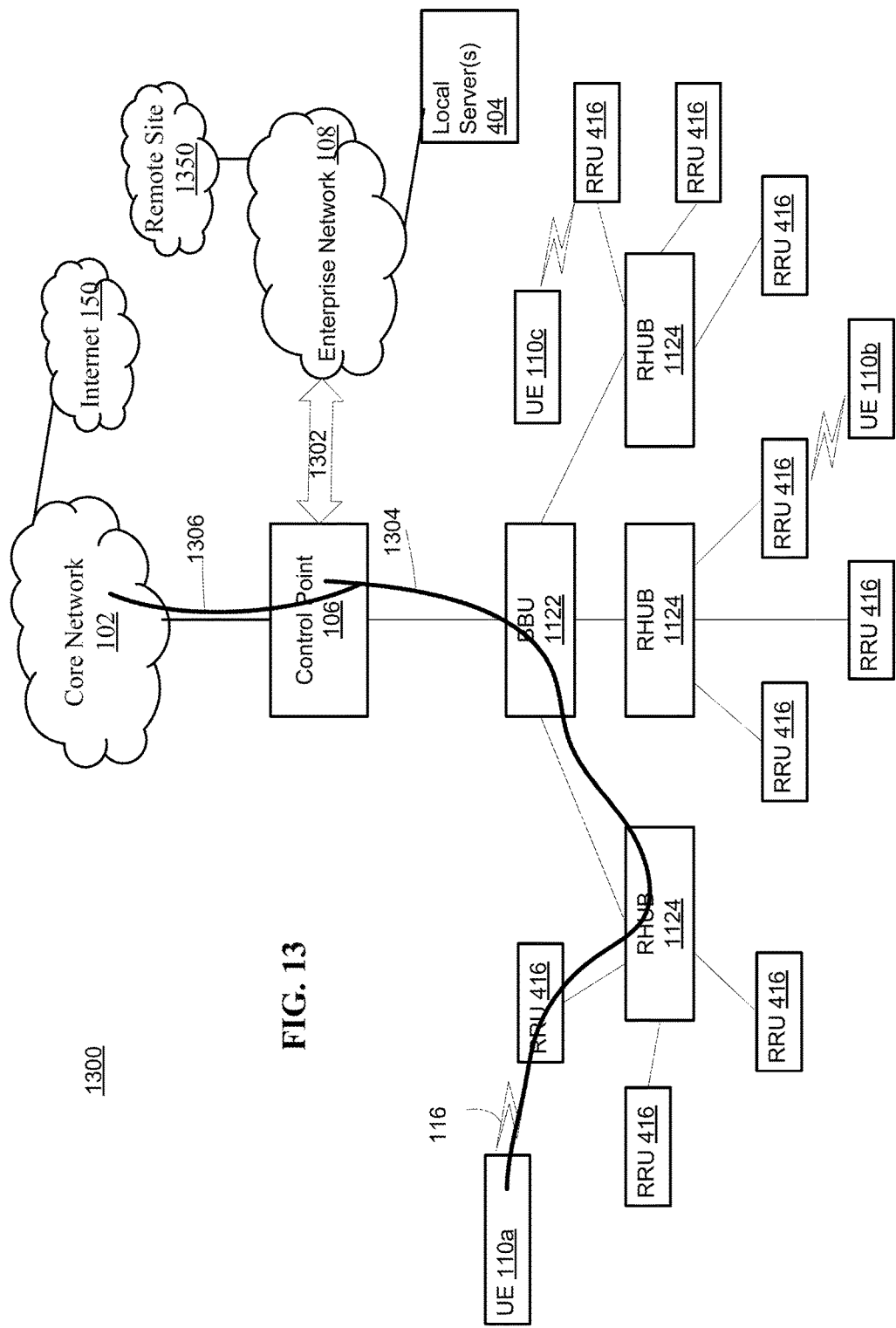
FIG. 13 depicts an example of destination based content control in a communication system.

FIG. 13 depicts an example of destination based content control in a communication system 1300. In this example, traffic is being routed by the control point 106 to the core network 102. The core network 102 may be an "operator home network," which is a well understood term to those of ordinary skill in the art.

FIG. 13 shows a "Web GUI" 1302 that allows the enterprise network 108 to configure groups containing lists of destinations. Each group may define what UEs 110 (or, alternatively, users) are included in the group. The destination(s) for the group may list one or more destinations. Here, the destination may include an operator home network. There could be more than one operator home network. In one embodiment, the destination(s) include one or more mobile virtual network operator (MVNO).

In one embodiment, the first packet of any new flow 1304 that is sent from the BBU 1122 to the control point 106 is inspected. In one embodiment, the destination IP address is checked against a group list. If the packet has a valid destination in the core network 102, the control point 106 routes (1306) this packet and subsequent packets in this flow to the core network 102. In one embodiment, the control point has a SNAT (Source Network Address Translation) a tunnel state installed in the vSwitch 310 to assist in the routing.

FIG. 13 also shows a remote site connected to the enterprise network 108. The control point 106 can bridge onto the remote site 1350. Thus traffic can flow from BBU 1122 to control point 106 to remote site 1350, without passing through the core network 102. This can be applied in a scenario in which a company has multiple distribution sites (e.g., campuses).

Note that the example in FIG. 13 is of a distributed base station connected to the control point 106. The communication system 1300 can be modified to operate with several integrated base stations connected to the control point 106.

Note that the control point 106 can perform many different routing techniques for the same UE 110 on a single APN. This could permit simultaneous LAN internetworked (e.g., FIG. 12) home routing (e.g., FIG. 13), neutral host (e.g., FIG. 11B), and multi-site (e.g., FIG. 13) on a single APN.

Figure 14:
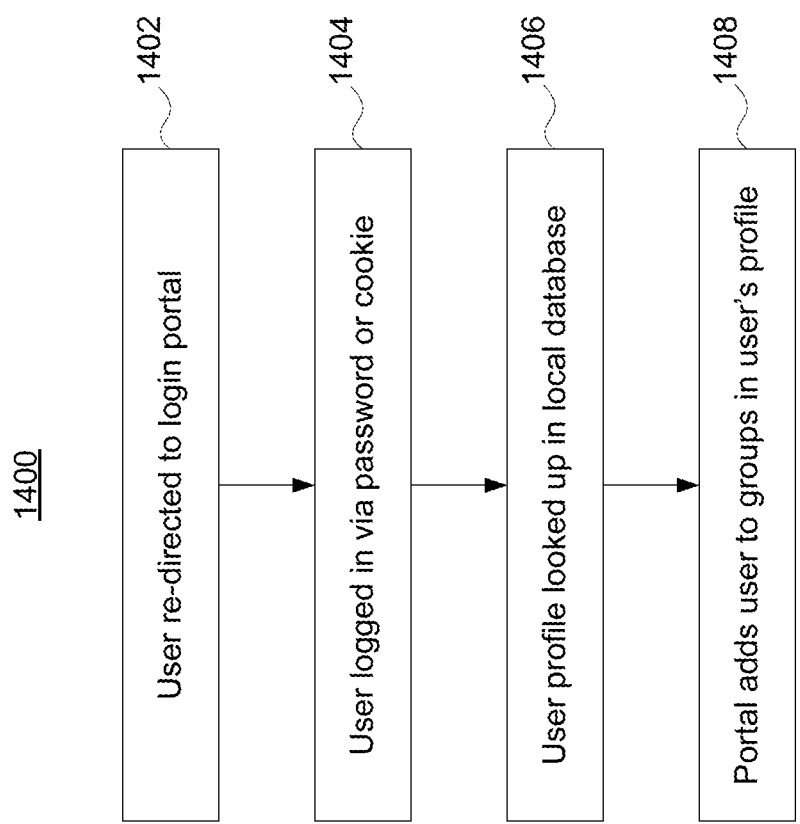
FIG. 14 is a flowchart of one embodiment of a process of policy control enforced by the control point.

FIG. 14 is a flowchart of one embodiment of a process 1400 of policy control enforced by the control point 106. This process illustrates the flexibility to make policy decisions via a local control console. Hence, policies can be adapted to a local venue. Process 1400 may be used to determine when to have local breakout of traffic; where to route local breakout traffic; what traffic to home route, where to home route traffic; conditions for re-directing to a login portal for new authentication; and/or local venue policies to drop or reject traffic.

In step 1402, a user is re-directed to a login portal in the enterprise network 108. In step 1404, the user is logged on via a password or cookie. In step 1406, the user profile is looked up in a local database 812 in the enterprise network 108. In step 1408, the portal adds the user to groups in the user's profile. Step 1408 may include providing information to the SCE 306 from the enterprise network 108.

The control point 106 provides for local zones, in one embodiment. As one example, this could be used to group radio access nodes by sectors. For example, the radio access nodes in zone 1 (e.g., first floor) may be open to everyone; the radio access nodes in zone 2 (e.g., second floor) may be open to only users in company A; and the radio access nodes in zone 3 (e.g., third floor) may be open to only users in company B.

Figure 15:
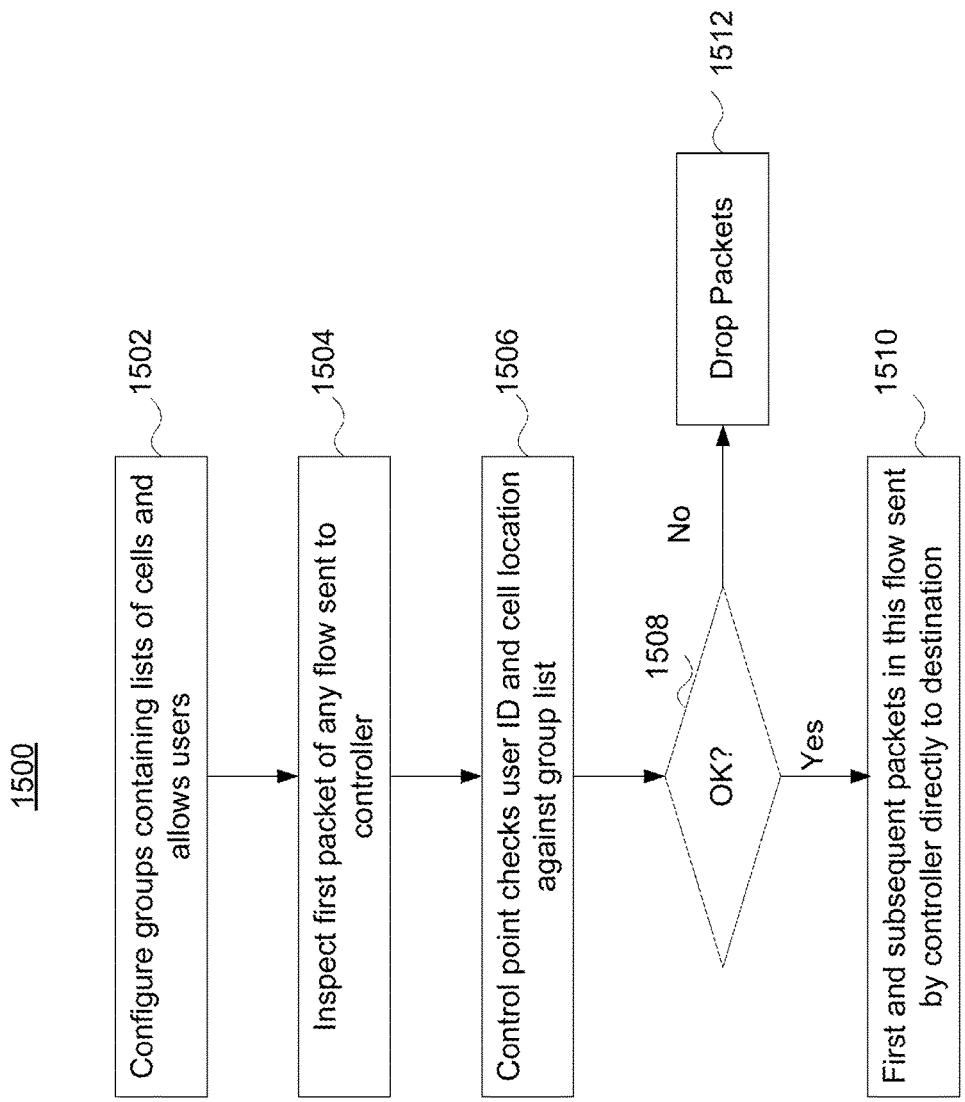
FIG. 15 is a flowchart of one embodiment of a process of providing for local zones by the control point.

FIG. 15 is a flowchart of one embodiment of a process 1500 of providing for local zones by the control point 106. In step 1502, groups containing lists of cells and allowed users are configured. The cells are small cells, in one embodiment. The cells serve a local venue, in one embodiment. The users are associated with a local enterprise, in one embodiment. Each cell may define the zone in terms of, for example, base stations 114, RRUs 416, etc. Thus, each zone could be served by a group of base stations 114 or RRUs 416. For example, the RRUs 416 attached to each RHUB 1124 in FIG. 11B could serve a different zone. As another example, the base stations 114 attached to each AR 1104 in FIG. 11A could serve a different zone. Note that there may be a separate server 404 in the enterprise network 108 for each zone.

In step 1504, the control point 106 (e.g., the SCE 306) inspects the first packet of each new flow it receives. This could be each new packet control point 106 receives from switch 1102, using the example in FIG. 11A. This could be each new packet control point 106 receives from BBU 1122, using the example in FIG. 11B. Note that other configurations are possible. Thus, the control point 106 might receive the packets from some other entity in RAN 112.

In step 1506, the control point 106 checks a user ID of the user associated with flow and the cell location of the UE 110 being used to send the flow.

In step 1508, the control point 106 determines whether the flow is permitted to be sent to the destination. If so, the control point 106 (e.g., vSwitch 310 operating under the instructions from SCE 306) routes the first packet and subsequent packets in this flow directly to the destination (step 1510).

If the flow is not permitted (step 1508=no), then the control point 106 drops this packet and subsequent packets in this flow (step 1512).

A variation of routing traffic from various zones is to push traffic to various zones. In one embodiment, the control point 106 provides for a local push service. This might be used to send targeted advertising to shoppers in a retail shopping mall, as one example. Different content could be pushed to different zones. In one embodiment, there may be a portal located in enterprise network 108. The portal may be provided with content from one of the servers 410 in the enterprise network 108. The portal may find all users logged in to a certain zone and push the content to their respective UEs 110 via web sockets.

In one embodiment, the control point 106 controls access to radio resources in the RAN 112. This may be used to dedicate radio resources to enterprise customers only. For example, a policy may restrict radio resources in a certain zone only to people who work in that zone. This can help to protect not only radio resource, but also content and services. Also, it can help prevent non-enterprise users from interfering with enterprise use cases.

Figure 16:
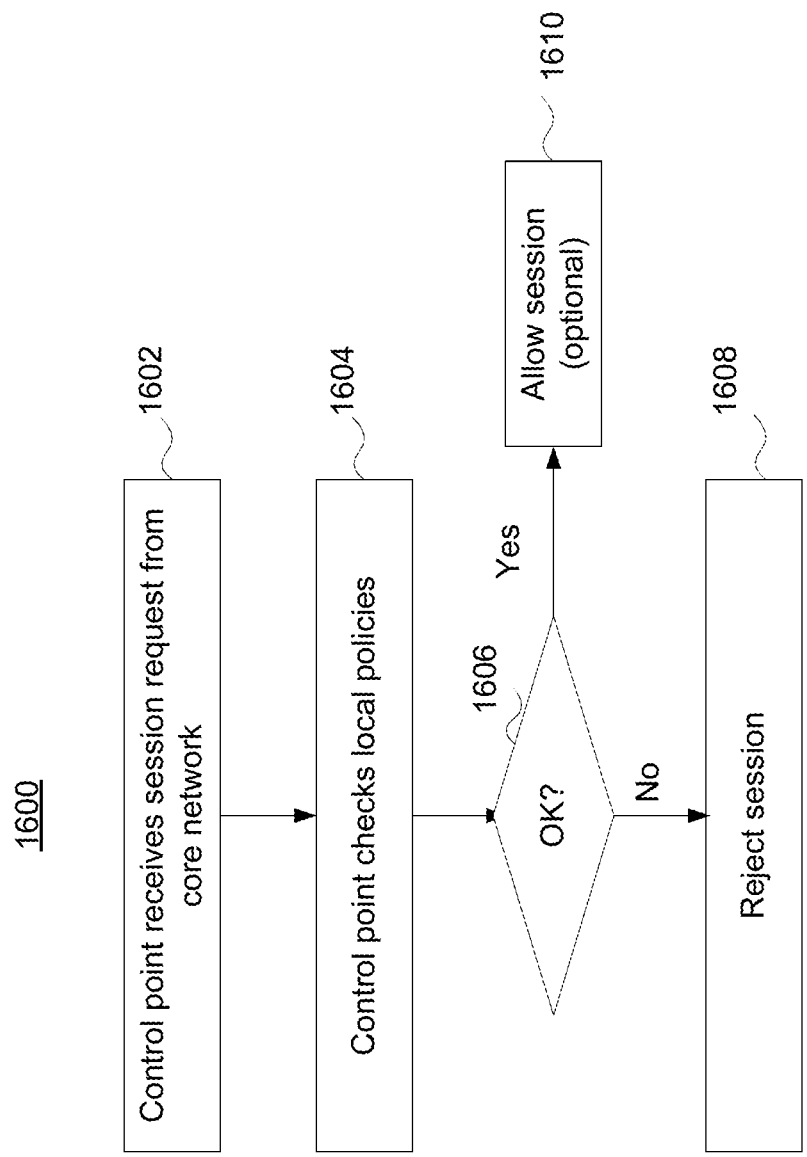
FIG. 16 is a flowchart of one embodiment of a process of the control point controlling access to radio resources in the RAN.

FIG. 16 is a flowchart of one embodiment of a process 1600 of the control point 106 controlling access to radio resources in a RAN 112 that serves a local venue. In step 1602, the control point 106 receives a session request from the core network 102. In one embodiment, this is a GTP-C create session request. In one embodiment, the request is received by gateway control 304. In step 1604, the control point 106 checks the local venue policies to determine if the session is permitted. If the session is not permitted (step 1606=no), then the request to create the session is rejected. The control point 106 may send a response to the core network 102 rejecting the request. Optionally, step 1610 could be performed, if the session is permitted (if step 1606=yes). In this case, the control point 106 could send a response to the control network 102 allowing the session to be created.

More and more users may bring their own wireless devices in to an enterprise, such as a workplace. In one embodiment, the control point 106 provides for a wireless device based control policy. As one example, a personal device being used for personal use on a corporate VLAN might be allocated just 1 Mbps bandwidth. As another example, a personal device being used for corporate use on a corporate VLAN might be allocated 10 Mbps bandwidth. As another example, a personal device accessing company contents may need a security block.

Figure 17:
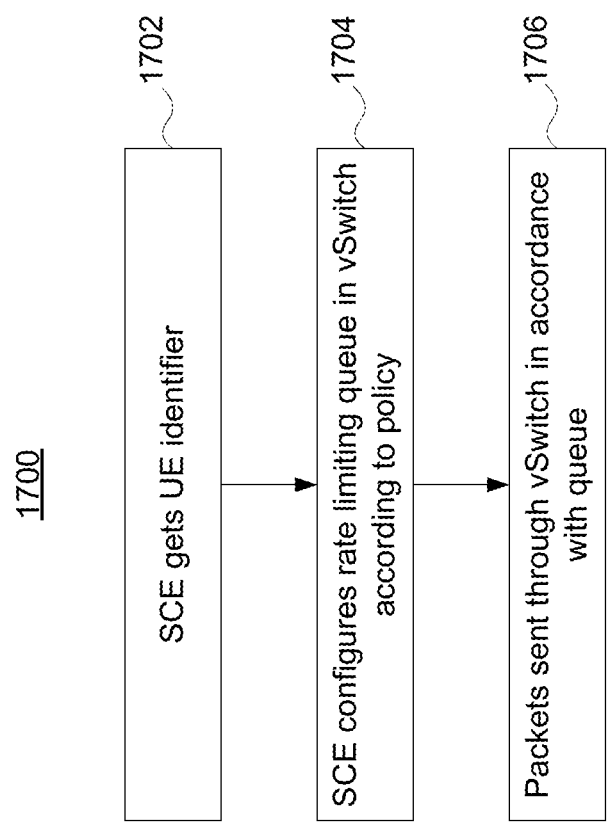
FIG. 17 is a flowchart of one embodiment of a process of the control point providing device based policy control.

FIG. 17 is a flowchart of one embodiment of a process 1700 of the control point 106 providing device based policy control. In step 1702, the SCE 306 obtains an identifier for the UE 110. The identifier could be, but is not limited to, a MAC address or an IMEI. In one embodiment, the identifier is provided to the SCE from the control logic 308. In one embodiment, the identifier is provided to the SCE from the gateway control 304.

In step 1704, the SCE 306 configures a rate-limiting queue in the vSwitch 310 according to a policy. The policy may have been provided from the enterprise network 108.

In step 1706, packets are sent through the vSwitch 310 in accordance with the rate-limiting queue.

Figure 18:
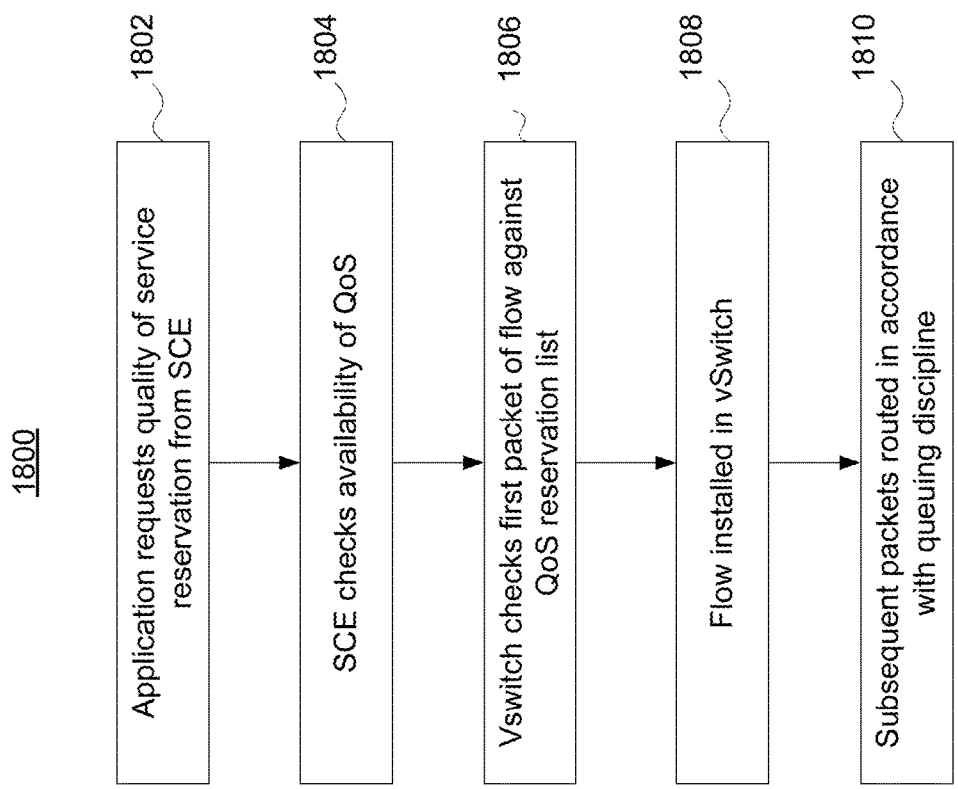
FIG. 18 is a flowchart of one embodiment of a process of the control point providing QoS provisioning.

FIG. 18 is a flowchart of one embodiment of a process 1800 of the control point 106 providing quality of service (QoS) reservation. This may be used to meet the QoS for a video service, an emergency announcement, VIP conferencing, as a few examples. In step 1802, an application requests a QoS from the SCE 306. In one embodiment, an application in the enterprise network 108 sends a request over the Northbound API to the SCE 306. In step 1804, the SCE 306 checks availability of the QoS. For the sake of illustration, the process 1800 assumes that the QoS is available. In one embodiment, the SCE 306 creates an QoS reservation list In step 1806, the control point 106 checks the first packet of a flow against the QoS reservation list. In step 1808, the directions for handling this packet flow are installed on the vSwitch 310. In step 1810, packets are sent through the vSwitch 310 to meet the QoS.

Figure 19:
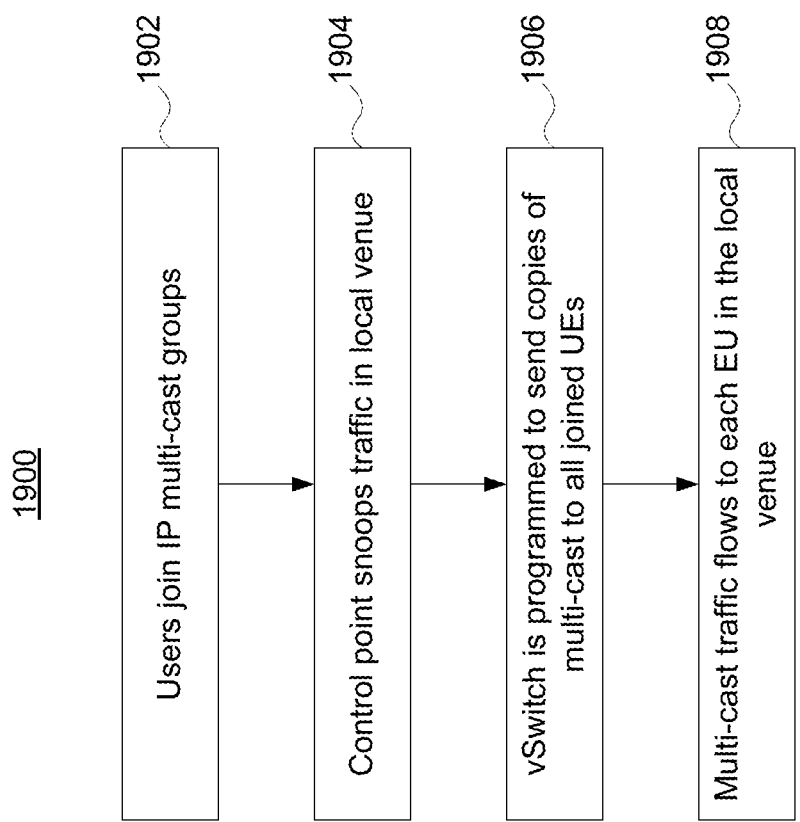
FIG. 19 is a flowchart of one embodiment of a process of the control point providing multi-cast traffic flow.

In one embodiment, the control point 106 supports multi-cast traffic flow. FIG. 19 is a flowchart of one embodiment of a process 1900 of the control point 106 providing multi-cast traffic flow. In step 1902, UEs 110 joint multi-cast groups. In one embodiment, the IGMP (Internet Group Management Protocol) is used. In step 1904, the control point 106 snoops traffic in the local venue. In one embodiment, the vSwitch 310 uses IGMP snooping. In step 1906, the vSwitch 310 is programmed to send copies of multi-cast traffic to all joined UEs 110. In step 1908, the vSwitch sends the multi-cast traffic to each of the UEs 110 in the local venue that is joined to the multicast group.

Figure 20:
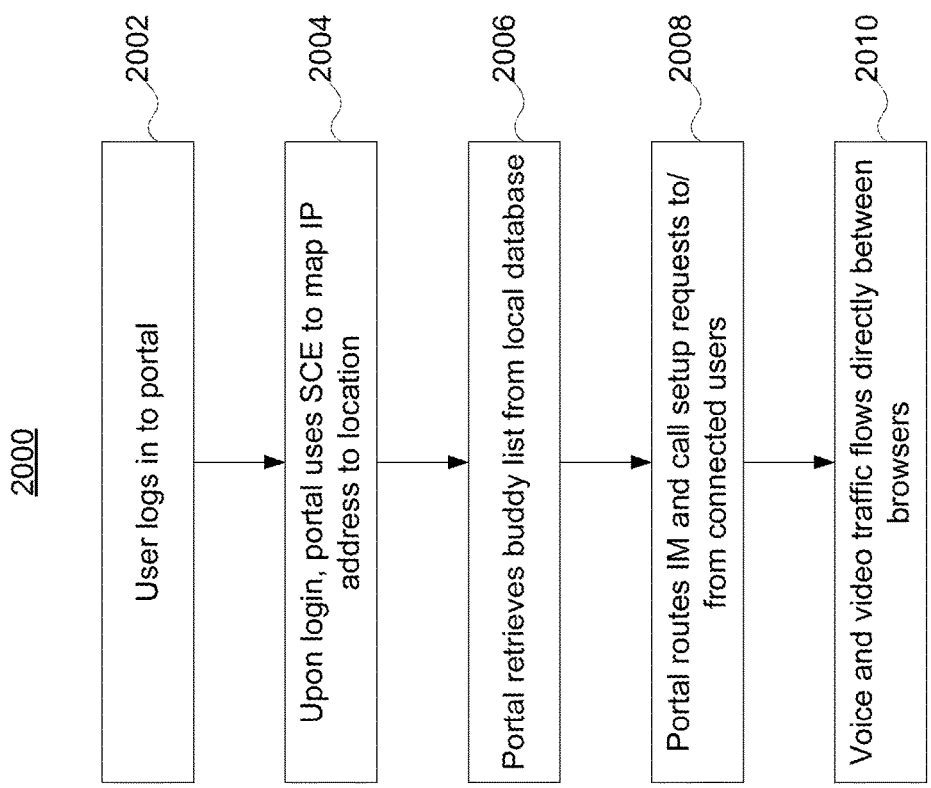
FIG. 20 is a flowchart of one embodiment of a process of the control point providing traffic flow management involving IM and video conferencing.

In one embodiment, the control point 106 provides for Instant Messaging (IM). The control point 106 may also provide for video conferencing. FIG. 20 is a flowchart of one embodiment of a process 2000 of the control point 106 providing traffic flow management involving IM and video conferencing.

Step 2002 includes a user (via an UE 110) logging into a portal in the enterprise network 108. Step 2004 includes the portal using the SCE 306 to map an IP address to a location. In one embodiment, an IP address is mapped to either an IMSI or NAI and an associated cell number. In step 2006, the portal receives a buddy list from a local database in the enterprise network 108.

In step 2008, the portal routes IM and call setup requests to/from connected users. In one embodiment, the portal acts as a UC (Unified Communications) server.

In step 2010, the vSwitch 310 routes voice and video traffic flows directly between browsers on the UE 110. Thus, voice and video codec traffic may flow directly between the browsers.

In some of the above example, a vSwitch 310 is used to route traffic or perform other traffic flow management. Network switches may be employed as physical hardware or virtually using software that provides network connectivity for systems employing virtualization technologies. Thus, modifications to the above examples are possible in which the vSwitch 310 is replaced with physical hardware (e.g., a physical network switch).

In an example embodiment, an enterprise gateway is used to control traffic between radio access nodes and a core network that provides wireless communication for wireless devices that connect to the radio access nodes. The radio access nodes may serve a local venue. The enterprise gateway includes a traffic flow element (e.g., SCE 306) that performs traffic flow management at the enterprise gateway for traffic associated with the radio access nodes based on policies from a local venue that is served by the radio access nodes. The enterprise gateway includes a UE identifier element that identifies a UE 110 or person associated with the UE 110. The enterprise gateway includes a packet evaluation element that analyzes packets, which can be used to determine how to route the packets. The enterprise gateway includes a policy analysis element that analyzes policies provided by the enterprise network 108 and/or core network 102 to determine how to perform traffic management. The enterprise gateway includes a routing element that perform the routing of packets based on the results of policy analysis. The enterprise gateway includes an event detection element that detects an event such as a UE 110 connecting to the network via a base station 114 or a hand-off from one base station 114 to another. In some example embodiments, the enterprise gateway may further include one or more elements for performing any one or combination of steps described in the embodiments.

In accordance with various embodiments of the present disclosure, the methods described herein may be implemented using a hardware computer system that executes software programs. Further, in a non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A device, comprising:
a non-transitory memory storage comprising instructions; and
one or more processors in communication with the non-transitory memory storage, wherein the one or more processors execute the instructions to:
provide a control point that controls traffic between radio access nodes and a core network that provides wireless communication for wireless devices that connect to the radio access nodes, wherein the radio access nodes serve a local venue;
perform traffic flow management at the control point for traffic associated with the radio access nodes based on policies adapted to the local venue; and
provide events regarding wireless devices connecting to or disconnecting from the radio access nodes, wherein the traffic flow management is based on the policies and the events.

2. The device of claim 1, wherein the one or more processors execute the instructions to:
communicate with the core network using a control plane interface compliant with a wireless communication protocol used by the core network to provide the wireless communication for wireless devices that connect to the radio access nodes.

3. The device of claim 2, wherein the one or more processors execute the instructions to:
instruct a switch with respect to performing the traffic flow management based on the policies and the events.

4. The device of claim 3, wherein the one or more processors execute the instructions to:
switch at the control point to route traffic from the radio access nodes, and implement a user plane of the wireless communication protocol for the wireless communication provided by the core network.

5. The device of claim 3, wherein the one or more processors execute the instructions to:
instruct a switch to perform the traffic flow management based on the policies and the events received from a wireless LAN controller.

6. The device of claim 1, wherein the one or more processors execute the instructions to:
handle handovers for wireless devices with respect to the radio access nodes.

7. The device of claim 1, wherein the instructions that cause the one or more processors to perform the traffic flow management cause the one or more processors to:
route traffic between a first wireless device connected to a radio access node of the radio access nodes and a second wireless device connected to a radio access node of the radio access nodes without passing through the core network.

8. The device of claim 1, wherein the instructions that cause the one or more processors to perform the traffic flow management cause the one or more processors to:
route traffic between a wireless device connected to a radio access node of the radio access nodes and a local network that serves the local venue without passing through the core network.

9. The device of claim 1, wherein the instructions that cause the one or more processors to perform the traffic flow management cause the one or more processors to:
instruct a physical network switch to route traffic associated with the radio access nodes.

10. The device of claim 1, wherein the radio access nodes are small cell nodes.

11. The device of claim 1, wherein the control point is an enterprise gateway that serves as a gateway to the local venue, wherein the policies are adapted to the local venue.

12. A method for providing localized control in a wireless network, the method comprising:
providing an enterprise gateway configured to control traffic between radio access nodes and a core network that provides wireless communication for wireless devices that connect to the radio access nodes; and
performing traffic flow management at the enterprise gateway for traffic associated with the radio access nodes, including:
i) transferring first data to a first radio access node of the radio access nodes via a data plane of a communication protocol used by the core network to provide the wireless communication, wherein transferring the first data to the first radio access node allows a wireless device connected to the first radio access node to communicate the first data with the core network, wherein the wireless device is configured with an access point name (APN) to communicate the first data with the core network; and
ii) transferring second data to a second radio access node of the radio access nodes via a wireless LAN data plane of a wireless LAN protocol to allow the wireless device to communicate the second data via the wireless LAN protocol, wherein the wireless device is configured with the same APN to communicate the first data with the core network and to communicate via the wireless LAN protocol.

13. The method of claim 12, wherein the performing traffic flow management at the enterprise gateway is based on policies from a local venue that is served by the radio access nodes and comprises the enterprise gateway:
inspecting a packet from a packet flow associated with a wireless device connected to a radio access node of the radio access nodes; and
determining how to route packets in the packet flow based on the policies from the local venue.

14. The method of claim 13, wherein the determining how to route the packets in the packet flow based on the policies from the local venue comprises the enterprise gateway:
determining whether to route the packets in the packet flow to the core network or to a local network that serves the local venue, wherein routing the packets to the local network bypasses the core network.

15. The method of claim 13, wherein the determining how to route packets in the packet flow based on the policies from the local venue is based on an identity of a user associated with the wireless device.

16. The method of claim 13, wherein the performing traffic flow management at the enterprise gateway for traffic associated with the radio access nodes further comprises:
providing point to multi-point wireless communication between the wireless device and other wireless devices connected to the radio access nodes with the wireless device configured with the same APN that is used by the wireless device to communicate data with the core network.

17. An apparatus, comprising:
a non-transitory memory storage comprising instructions; and
one or more processors in communication with the non-transitory memory storage, wherein the one or more processors execute the instructions to:
  provide a control point that controls traffic between radio access nodes and a core network that provides wireless communication for wireless devices that connect to the radio access nodes;
  perform traffic flow management at the control point for traffic associated with the radio access nodes, comprising:
    i) transfer first data to a first radio access node of the radio access nodes via a data plane of a communication protocol used by the core network to provide the wireless communication, wherein transferring the first data to the first radio access node allows a wireless device connected to the first radio access node to communicate the first data with the core network, wherein the wireless device is configured with an access point name (APN) to communicate the first data with the core network; and
    ii) provide point to multi-point wireless communication between the wireless device and other wireless devices connected to the radio access nodes with the wireless device configured with the same APN that is used by the wireless device to communicate data with the core network.

18. The apparatus of claim 17, wherein the one or more processors execute the instructions to perform the traffic flow management based on policies from a local venue that is served by the radio access nodes.

19. The apparatus of claim 17, wherein the instructions that cause the one or more processors to perform the traffic flow management cause the processor to:
  iii) transfer second data to a second radio access node of the radio access nodes via a wireless LAN data plane of a wireless LAN protocol to allow the wireless device to communicate the second data via the wireless LAN protocol, wherein the wireless device is configured with the same APN to communicate the first data with the core network and to communicate via the wireless LAN protocol.

20. The method of claim 12, wherein performing the traffic flow management at the enterprise gateway for traffic associated with the radio access nodes is based on policies from a local venue that is served by the radio access nodes.

* * * * *